(12) United States Patent
Vaganov et al.

(10) Patent No.: US 8,183,077 B2
(45) Date of Patent: May 22, 2012

(54) FORCE INPUT CONTROL DEVICE AND METHOD OF FABRICATION

(76) Inventors: Vladimir Vaganov, Los Gatos, CA (US); Nickolai Belov, Los Gatos, CA (US)

( * ) Notice: Subject to any disclaimer, the term of this patent is extended or adjusted under 35 U.S.C. 154(b) by 108 days.

(21) Appl. No.: 12/873,184

(22) Filed: Aug. 31, 2010

(65) Prior Publication Data
US 2010/0323467 A1    Dec. 23, 2010

Related U.S. Application Data

(62) Division of application No. 11/803,788, filed on May 15, 2007, now Pat. No. 7,791,151.

(60) Provisional application No. 60/802,856, filed on May 24, 2006.

(51) Int. Cl.
G01R 27/26    (2006.01)
(52) U.S. Cl. .......................................... 438/50; 257/417
(58) Field of Classification Search .......... 257/417–419; 361/290–291; 324/661–662; 438/50–53
See application file for complete search history.

(56) References Cited

U.S. PATENT DOCUMENTS

| | | |
|---|---|---|
| 6,570,556 B1 | 5/2003 | Liao et al. |
| 6,596,344 B2 | 7/2003 | Zhuang et al. |
| 6,642,857 B1 | 11/2003 | Schediwy et al. |
| 6,654,004 B2 | 11/2003 | Hoggarth |
| 6,654,005 B2 | 11/2003 | Wang |
| 6,697,049 B2 | 2/2004 | Lu |
| 6,707,445 B1 | 3/2004 | Hasemann |
| 6,750,408 B2 | 6/2004 | Inoue et al. |
| 6,753,850 B2 * | 6/2004 | Poole .......................... 345/161 |
| 6,771,992 B1 | 8/2004 | Tomura et al. |
| 6,774,887 B2 | 8/2004 | Lu |
| 6,788,291 B2 | 9/2004 | Burry |
| 6,809,529 B2 | 10/2004 | Okada et al. |
| 6,809,721 B2 | 10/2004 | Love |
| 6,859,048 B2 | 2/2005 | Okada et al. |
| 6,894,390 B2 | 5/2005 | Schammler et al. |
| 6,903,724 B2 | 6/2005 | Grivas et al. |
| 6,920,041 B2 | 7/2005 | Oross et al. |
| 6,940,495 B2 | 9/2005 | Morimoto et al. |
| 6,950,092 B2 | 9/2005 | Buss |

(Continued)

OTHER PUBLICATIONS

International Search Report from PCT/US07/11618 mail date Nov. 16, 2007.

(Continued)

*Primary Examiner* — Kiesha Bryant
*Assistant Examiner* — Mark Tornow
(74) *Attorney, Agent, or Firm* — Fitch, Even, Tabin & Flannery, LLP

(57) ABSTRACT

Methods of fabricating 3-dimensional force input control devices are disclosed. These roughly comprise: providing a first substrate, fabricating stress-sensitive IC components and signal processing IC on a side one of the first substrate, fabricating one or more closed trenches on a side two of the first substrate within each die area, creating elastic element, frame area and rigid island, providing a second substrate, patterning a side two of the second substrate to define areas for deep etching, creating a layer of bonding material in local areas on at least one of the surfaces of the side one of the second substrate and the side two of the first substrate, aligning and bonding the side two of the first substrate with the side one of the second substrate, etching the second substrate from the side two through to the first substrate, dicing the two bonded substrates into multiple separate dice.

20 Claims, 29 Drawing Sheets

U.S. PATENT DOCUMENTS

| | | | |
|---|---|---|---|
| 6,952,197 B1 | 10/2005 | Nakamura et al. | |
| 7,262,071 B2 * | 8/2007 | Larmer et al. | 438/53 |
| 2001/0003326 A1 * | 6/2001 | Okada et al. | 200/516 |
| 2002/0164111 A1 * | 11/2002 | Mirza | 385/18 |
| 2005/0047721 A1 | 3/2005 | Chen et al. | |
| 2005/0160814 A1 * | 7/2005 | Vaganov et al. | 73/514.01 |
| 2005/0190152 A1 * | 9/2005 | Vaganov | 345/157 |
| 2006/0060877 A1 | 3/2006 | Edmond et al. | |

OTHER PUBLICATIONS

Non-final Office Action from U.S. Appl. No. 11/803,788 mailed Oct. 23, 2009.

Notice of Allowance from U.S. Appl. No. 11/803,788 mailed May 3, 2010.

Vaganov, U.S. Appl. No. 60/802,856, filed May 24, 2006.

Vaganov, U.S. Appl. No. 11/803,788, filed May 15, 2007.

* cited by examiner

FORCE INPUT CONTROL DEVICE AND METHOD OF FABRICATION

This application is a Divisional of U.S. application Ser. No. 11/803,788, filed May 15, 2007, to Vladimir Vaganov, entitled FORCE INPUT CONTROL DEVICE AND METHOD OF FABRICATION, which claims the benefit of U.S. Provisional Application No. 60/802,856, filed May 24, 2006, entitled FORCE INPUT CONTROL DEVICE AND METHOD OF FABRICATION, all of which are incorporated in their entirety herein by reference.

BACKGROUND OF THE INVENTION

1. Field of the Invention

This invention relates to semiconductor devices, Micro Electro Mechanical Systems (MEMS), sensors and more specifically to three dimensional (3D) three-axis force input control devices, finger force sensors, fingermouse, micro-joysticks and their fabrication.

2. Background

The 3D force sensors based on micromachined silicon chips with stress sensitive components on the flexible diaphragm are known. Prior art, described in U.S. patent application Ser. No. 11/025642, is shown in FIG. 1. It uses a sensor chip 10 with a rigid frame 12 and a rigid central part (or rigid island or boss) 16 of a die, connected with the frame by a thinner elastic diaphragm 14. A rigid force-transferring element 31 is firmly coupled to the rigid island 16 of a sensor die 10 through an intermediate layer 33. When an externally applied force is transferred to the rigid island 16, the deflection of the island creates deformation and stress in the elastic diaphragm element 14, reaching the locations of the stress sensitive IC components 18, 20, 22. Because the rigid island 16 is located within the thickness dimension of the sensor die 10 and the width of the diaphragm is small and in the submillimeter range, it is difficult to apply a force to the rigid island 16 without applying it to the frame of the die. As a result, the sensitivity to the external force in lateral X and Y directions is not sufficient to provide good characteristics of 3D force input control device.

In order to resolve this deficiency a rigid force-transferring element 31 is added to the structure of the die 10 and island 16. This rigid force-transferring element 31 is firmly coupled to the rigid island 16 of a sensor die 10 through an intermediate layer 33. This extension of the rigid island height above the die frame thickness enhances sensor sensitivity to all components of the applied vector force. These components of force vector are transferred to the rigid island 16 of the sensor die 10 and then to the elastic element 14 and sensitive IC components 18, 20, 22.

The prior art is describing the device however doesn't teach the methods of fabrication of these devices.

The prior art teaches that by changing the size of the rigid force-transferring element 31 it is possible to change the ratio of sensitivities in X and Y directions, on one hand, and Z direction, on the other hand. However the prior art device provides only limited range of sensitivities ratio and does not provide an opportunity to make X and Y sensitivities also unequal with predetermined ratio. The need for having all three sensitivities unequal can be illustrated by gaming application, where motion of the gaming object in X and Y directions could be different and the action function in Z direction, as a rule, requires higher force and therefore lower sensitivity.

Depending on the specific application the trench 15 between frame 12 and rigid island 16 could be either filled in with elastic plastic material or not independently on the size of the rigid force-transferring element 31. The prior art doesn't teach how to do that.

For most of the high volume applications of three-dimensional (3D) force input control devices the most important requirement is their very low cost. Therefore the least costly and most efficient methods of fabrication are critical for such devices.

SUMMARY OF THE PRESENT INVENTION

A three-dimensional (3D) force input control device and fabrication method is presented. A 3D input control device provides a variety of functions, for example for hand-held device controlling directional inputs through the application of finger force.

The apparatus claimed is a three-dimensional input control device for perceiving 3D force signals and converting them into electrical signals for digital processing. The three-dimensional input control device comprises: 1) a sensor die formed within semiconductor substrate; 2) an elastic element within said sensor die; 3) a frame formed around said elastic element and coupled with at least part of the periphery of the elastic element all within the substrate; 4) at least three IC components sensitive to mechanical stress and located in the elastic element for providing electrical output signals proportional to the mechanical stress in the location of the IC components; 5) at least one rigid island element formed within said sensor die and coupled with the elastic element; the rigid island is separated from the frame by a closed trench; 6) at least one rigid force-transferring element coupled to the rigid island of a sensor die; 7) at least one polymer spring element coupling the force-transferring element with an external; and 8) at least one electronic circuit for processing output signals from the IC components sensitive to the mechanical stress.

The rigid force-transferring element and rigid island transfer an external vector force to the elastic element and mechanical stress in the elastic element is created. At least three mechanical stress sensitive IC components formed in the elastic element provide electrical output signals. These electrical output signals are processed by at least one electronic circuit. As a result of the processing, values of force vector components are calculated and used for input control. For example, position of cursor on the screen, speed of cursor, volume of sound, sound balance, motion and actions of a game character, etc. can be controlled by the input control signals.

A method of fabrication of 3-dimensional force input control device according to the present invention comprises the steps of: 1) providing a first substrate having side one and side two; 2) fabricating stress-sensitive IC components and signal processing IC on the side one of the first substrate; 3) fabricating closed trenches on the side two of the first substrate within each die area, said trenches define elastic elements, frame areas and rigid islands and separate rigid islands from the frame areas; 4) providing a second substrate having side one and side two; 5) depositing and patterning a bonding material on at least one of the surfaces: side one of the second substrate, side two of the first substrate; 6) aligning and bonding the side two of the first substrate with the side one of the second substrate; 7) micromachining the second substrate from the side two through to the first substrate; 8) dicing of the stack of bonded substrates.

The method of fabrication according to the present invention allows very low cost 3D force input control devices.

In the three-dimensional input control device according to the present invention the rigid force-transferring element and the closed trench around the rigid island have geometry and mutual position such that they determine required access channel from outside to the closed trench and hydraulic resistance of the access channel to a compressible material filling in at least part of the closed trench. In particular, geometry and mutual position of the rigid force-transferring element and the closed trench around the rigid island can be chosen to allow material of the polymer spring element to fill the closed trench around the rigid island in the sensor die. Alternatively, geometry and mutual position of the rigid force-transferring element and the closed trench around the rigid island can be chosen to prevent penetration of material of the polymer spring element into the closed trench.

In the 3D input control device according to the present invention the rigid force-transferring element is connected to the rigid island through a connection area. Geometry of the rigid force-transferring element; size, shape, and profile of the connection area and mutual position of the rigid force-transferring element and the connection area can be chosen such that they determine a required sensitivity of the 3D input control device to the components of applied force vector. In particular, required sensitivity of the 3D force input control device to the X and Y components of the applied force, which are parallel to the plane of the substrate can be achieved by selecting the X and Y linear dimensions of the rigid force-transferring element in the plane of the substrate relative to the X and Y linear dimensions of the rigid island. Required sensitivity of the 3D force input control device to the Z component of the applied force can be achieved by selecting the area of the rigid force-transferring element in the plane of the substrate relative to the area of the sensor die.

Additionally, in the 3D input control device according to the present invention the rigid force-transferring element and the frame formed around the elastic element have geometry and mutual position such that they provide required level of mechanical overload protection. When an excessive force is applied to the force input control device, the force-transferring element moves and gets into a mechanical contact with the frame. It limits the maximum displacement of the force-transferring element and provides mechanical overload protection. In addition, the overload protection can be provided by filling a gap between the rigid force-transferring element and the frame of the sensor die with a gap filler compressible material.

Elements in the various embodiments can vary in design and material to realize different aspects or obtain different advantages.

DETAILED DESCRIPTION OF THE PREFERRED EMBODIMENTS

Figure 1:
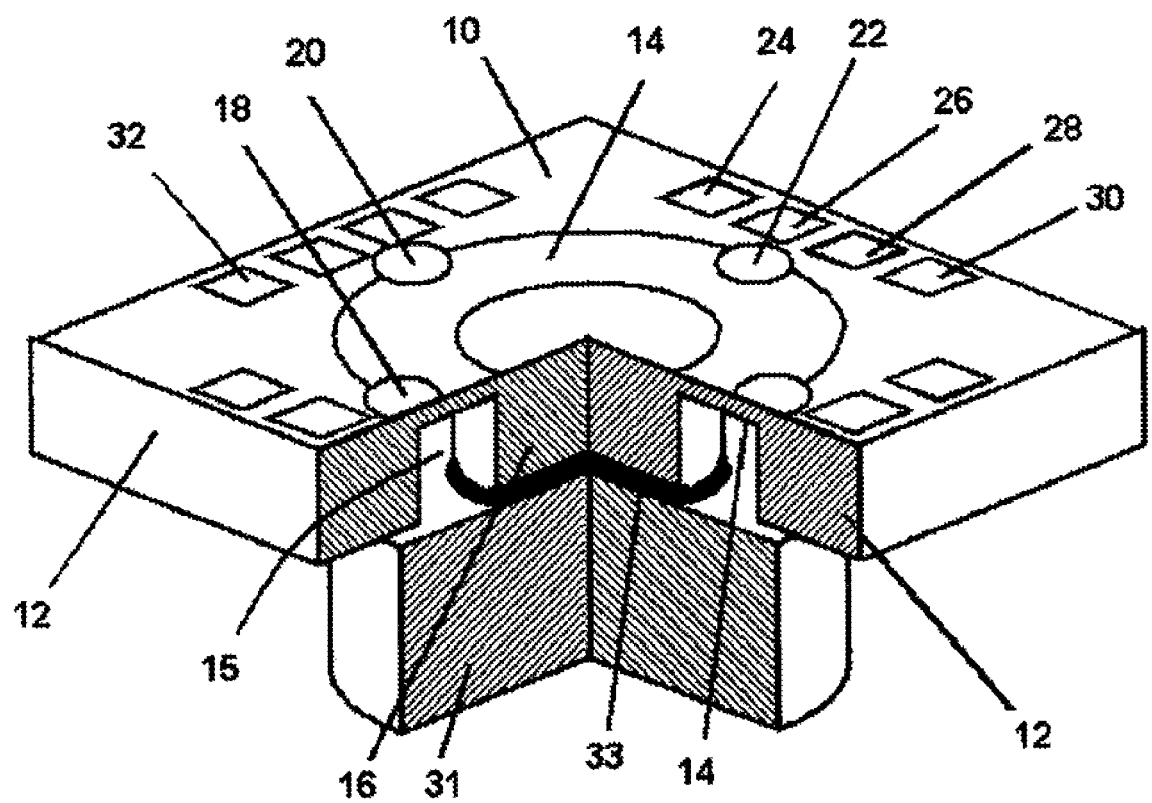
FIG. 1 is a view of a prior art 3D force sensor die.

An object of the present invention is to provide a 3-dimensional force input interface control device for high volume consumer markets like cell phones, portable garners, digital cameras, etc.

Another object of the present invention is to provide a method of fabrication of 3-dimensional input control of different functions in electronic consumer devices.

Another object of the present invention is to provide a method of fabrication of low cost 3-dimensional force input control device.

Another object of the present invention is to provide a method of fabrication of small size 3-dimensional force input control device.

Another object of the present invention is to provide methods of fabrication for increasing reliability of 3-dimensional force input control device.

Another object of the present invention is to provide methods of fabrication for increasing stability of 3-dimensional force input control devices.

Another object of the present invention is to provide a method of fabrication of 3-dimensional force input control devices, which accommodate design selectable ratios between X, Y, Z sensitivities.

Another object of the present invention is to provide a method of fabrication of 3-dimensional input force control devices, which has low cross-axis sensitivity.

Another object of the present invention is to provide a method of fabrication of 3-dimensional input force control devices, which allows process integration with other sensors and CMOS.

Another object of the present invention is to provide a method of fabrication of 3-dimensional input force control devices, which are scalable.

Another object of the present invention is to provide a method of fabrication of 3-dimensional force input control devices, which allow selectable combinations of applied force and deflection.

A method of fabrication of 3-dimensional force input control devices comprises the following steps: 1) providing a first substrate having side one and side two; 2) fabricating stress-sensitive IC components and signal processing IC on the side one of the first substrate; 3) fabricating of output contact elements, chosen from the group of: pads for wire-bonding, under bump metallization (UBM), solder balls, solder bumps, redistribution metallization and combination of the above; 4) fabricating closed trenches on the side two of the first substrate within each die area, said trenches define elastic elements, frame areas and rigid islands and separate rigid islands from the frame areas; 5) providing a second substrate having side one and side two; 6) opening areas for micromachining either on the side two, or on the side one, or on both sides of the second substrate; 7) micromachining at least one of the sides of the second substrate; 8) depositing a bonding material on at least one of the surfaces: side one of the second substrate, side two of the first substrate; 9) patterning bonding material; 10) aligning and bonding the side two of the first substrate with the side one of the second substrate; 11) micromachining the second substrate from the side two through to the first substrate; 12) dicing of the stack of bonded substrates.

It should be understood that these steps could be used in different combinations in fabrication of three-dimensional force input control devices.

Some process options are applicable to different embodiments and described below for convenience.

In an embodiment of the invention fabricating closed trenches on the side two of the first substrate within each die area can be done by any of the following methods: deep reactive ion etching, wet anisotropic etching, electrochemical etching, laser etching, wet isotropic etching, dry isotropic etching, electro-erosion; ultrasound etching and combination of the above methods as, for example, combination of deep reactive ion etching and wet anisotropic etching.

Trenches in the saw lines also can be formed in the first substrate within the process of micromachining closed trenches surrounding rigid islands.

Opening an area for deep etching on the side two of the second substrate can be done either prior to or post bonding of the first and second substrates.

Depositing of a bonding material can be done either on both substrates or on one substrate only. Several types of bonding processes can be used: polymer bonding, frit glass bonding, anodic bonding, eutectic bonding, for example Au—Si, Au—Sn, Au—In, Cu—Sn, Ag—Sn, laser-assisted bonding, plasma activated direct oxide bonding, thermo-compression bonding, and soldering.

Deposition of a bonding material in preparation for bonding can be done either on the whole surface of the substrate or in some areas only and using different methods including oxidation, epitaxy, chemical vapor deposition, evaporation, sputtering, electroless plating, electroplating, spinning, deposition through shadow mask, screen printing, spraying, electrophoresis, printing, and dipping.

Patterning of the deposited bonding material can be done using photoresist mask defined by photolithography. Both regular lithography and lift-off lithography can be used.

When photo-sensitive materials are used for substrate bonding then these materials can be patterned directly using photolithography.

Micromachining the second substrate can be done either post bonding or both prior to and post bonding to the first substrate. In all cases micromachining of the second substrate can include more than one micromachining step. In particular, micromachining of the second substrate within each die area can be done by one of the following methods: (a) deep reactive ion etching (DRIE) from the side two after bonding of the first and second substrates; (b) combination of DRIE before bonding of the first and second substrates followed by DRIE after the bonding; (c) combination of wet anisotropic etching before bonding of the substrates followed by DRIE after the bonding; (d) combination of DRIE followed by wet anisotropic etching before bonding of the substrates followed by DRIE after the bonding; (e) combination of two-step DRIE before the bonding of the first and second substrates followed by DRIE after the bonding; (f) combination of two-step DRIE followed by wet anisotropic etching before the bonding of the substrates followed by DRIE after the bonding. Other sequences of micromachining steps can be used to define force-transferring elements in the second substrate.

Cutting also can be used for micromachining of the force-sensitive input device substrates. In particular, sawing and laser cutting can be used to define force-transferring elements in the second substrate.

Alignment schemes used in positioning the first and second substrates relative to each other should provide the following alignments: (a) alignment of the patterns and structures formed on the side one and the side two of the first substrate. In particular, stress-sensitive components should be aligned to the certain locations on the areas of the trenches etched within each die on the side two of the first substrate. (b) Alignment of a pattern on the side two of the second substrate to a pattern formed either on the side one of the second substrate or on the first substrate. (c) Alignment of the rigid islands formed in the first substrate and patterns or structures' formed in the second substrate at pre-bonding alignment step. For example, rigid islands can be aligned to the areas covered by patterned bonding materials, or to the areas occupied by force-transferring elements, or to profile formed on the side one of the second substrate.

Alignment of the patterns and structures formed on the front and side twos of the first substrate can be achieved by: (a) double-side alignment marks on both sides of the first substrate; (b) the first mask on the side two of the first substrate aligned to a pattern previously formed on the side one of the first substrate.

Alignment of the patterns and structures formed on the front and side twos of the second substrate can be achieved by: (a) double-side alignment marks on both sides of the second substrate; (b) the first mask used on the side two of the second substrate aligned to a pattern previously formed on the side one of the first substrate after bonding of the first substrate to the second substrate.

Pre-bonding alignment of the first and second substrates can be achieved by aligning of patterns or structures formed on: (a) the side two of the first substrate and the side two of the second substrate; (b) the side one of the first substrate and the side one of the second substrate; (c) the side two of the first substrate and the side one of the second substrate; (d) the side one of the first substrate and the side two of the second substrate.

Twelve embodiments described below illustrate some of the invented fabrication methods of the force-sensitive input devices. Description of the embodiments is focused on a representative sample of all possible embodiments. In some embodiments the material of substrates is assumed to be silicon.

Term "wafer" is used in the description of these embodiments as well as term "substrate". However, it should be understood that other than silicon materials and other than round wafer-shaped substrates can be used without departing from the scope of the present invention. The first substrate is often referred to as a "sensor wafer" and the second substrate is often referred to as "mechanical wafer".

First Embodiment

Figure 2:
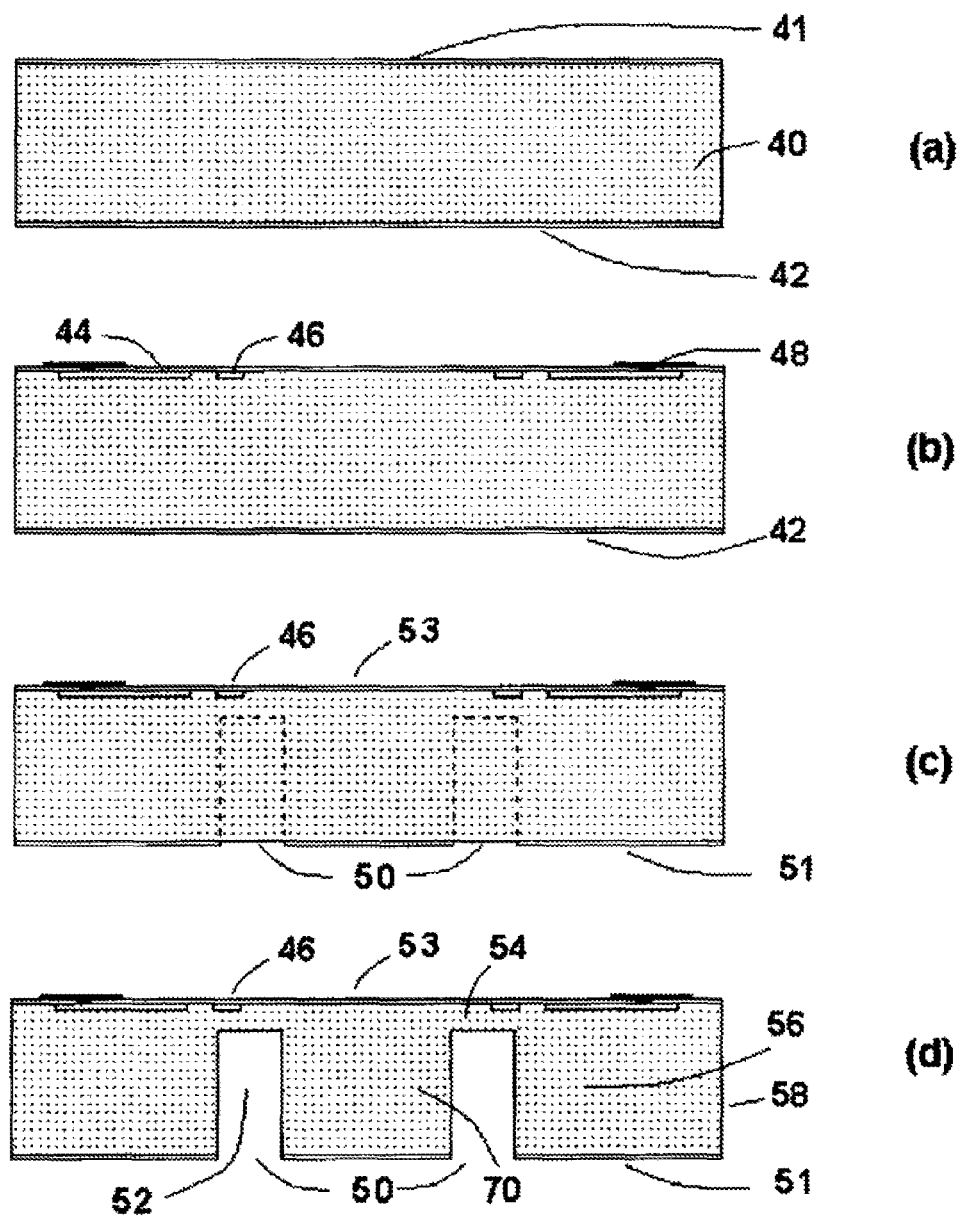
FIG. 2 illustrates a fabrication process of a first (sensor) substrate in accordance with embodiments of the invention.

FIG. 2a shows initial sensor wafer 40. Initial substrate material can be either P-type or N-type, uniform silicon or silicon-on-isolator (SOI), single-side polished or double-side polished, 4", 6", 8", 12" diameter wafer, etc. Sensor wafer (first substrate) has a side one 41 and side two 42.

FIG. 2b shows sensor wafer after one or more IC circuits 44, 46 are fabricated on the side one. Different IC circuits 44 and stress-sensitive circuits 46 can be fabricated at this step. In the simplest case IC circuit can be just a set of at least three piezoresistors. Some signal conditioning and processing circuits can be fabricated on the same chip. For example, these circuits can include amplifiers, multiplexors, analog-to-digital converters, analog-to-frequency converters, digital-to-analog converters, logic circuits, registers, microprocessors, memory, etc. Other than piezoresistors types of stress-sensitive components can be fabricated on the sensor wafer, including, for example: bipolar piezotransistors, NMOS piezotransistors, PMOS piezotransistors, CMOS piezotransistors, unipolar piezotransistors and others. Metal or other conductive interconnections between components, as for example, poly-silicon interconnects, and also contact bond pads 48 are formed on the side one of the sensor wafer at this step.

Micromachining of the sensor wafer is done after fabrication of IC circuits on the side one of the sensor wafer is completed. FIG. 2c shows a pattern 50 for deep etching defined on the side two of the sensor wafer. Pattern 50 on the side two should be aligned to some pattern on the side one 53 of the sensor wafer to provide alignment of stress-sensitive components 46 with the pattern 50 for deep etching.

FIG. 2d shows completed first substrate or sensor wafer after deep etching from the side two. Deep etching is done using deep reactive ion etching (DRIE). Photoresist can be used as a mask during this step. Dielectric layer 51 also can serve as a mask for DRIE. Other materials, for example, aluminum also can serve as a mask for DRIE. Cavities 52 are formed on the side two of the sensor wafer, as a result of this step. DRIE-etched cavities 52 have annular shape. The cavities define elastic elements or diaphragm 54 and rigid island in the center of the diaphragm 54. Stress-sensitive components 46 are located within or close to either edge of the diaphragm areas 54 and along certain crystallographic directions.

Figure 3:
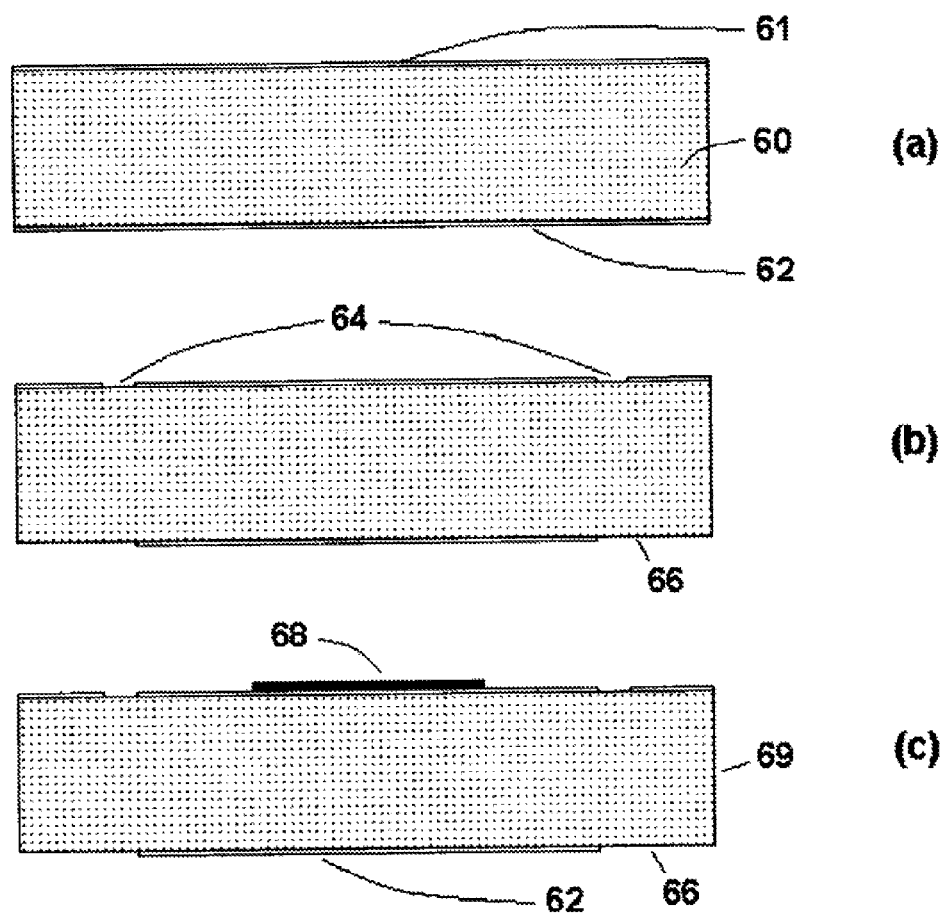
FIG. 3 illustrates a fabrication process of a second (mechanical) substrate prior to bonding with the first substrate.

FIG. 3 shows an example of a fabrication process of the second substrate or mechanical wafer according to the first embodiment. FIG. 3a shows initial wafer 60, which has side one 61 and side two 62. Initial material can be standard uniform silicon substrate either P-type or N-type or any other mechanically strong material, which can be batch micromachined with required accuracy. It can be single-side polished or double-side polished 4", 6", 8", 12" diameter wafer.

FIG. 3b shows patterns 64, 66 formed on both sides of the mechanical wafer at the next step. The patterns 64 and 66 are aligned to each other.

Bonding material 68 is deposited on the side one of the second wafer at the next step as shown in FIG. 3c. In some cases bonding material is deposited everywhere on the side one of the wafer and patterned after that. Patterning of the bonding material 68 is done using standard lithography and etching of the bonding material through a mask of photoresist. It is used for metals, like Au, capable of forming eutectic bonding with silicon. In other case, when bonding material 68 is chosen from a class of photo-sensitive materials, its patterning can be done using standard lithography process without additional photoresist layer, for example in case of photo-sensitive polyimide or negative photoresist. Still another option for forming a pattern of bonding material on the side one of the mechanical wafer is screen printing, for example screen printing of frit glass. Other known in the art methods, as deposition of the bonding material using a shadow mask, also are used.

Figure 4:
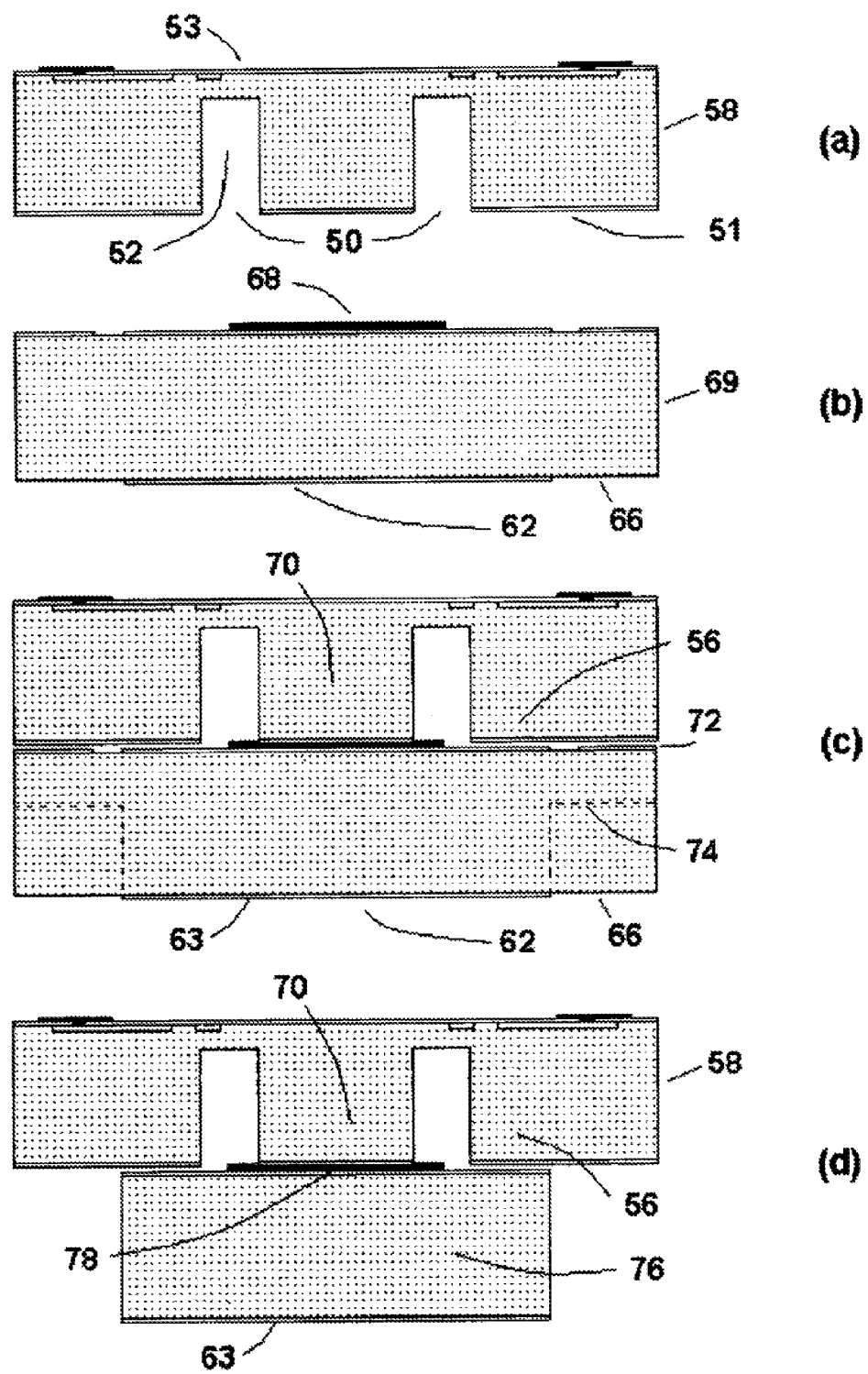
FIG. 4 illustrates a fabrication process back-end, where a second substrate is exposed to deep reactive ion etching after bonding to a first substrate and force-transferring elements are formed within each die area by removing all silicon on the second substrate with the exception of a force-transferring element.

FIG. 4 shows a fabrication process back-end according to the first embodiment. FIG. 4a shows first (sensor) wafer 58 after processing steps described above and illustrated by FIG. 2. FIG. 4b shows second (mechanical) wafer 69 after processing steps described above and illustrated by FIG. 3. FIG. 4c shows the two wafers aligned and bonded together. As a result of alignment, rigid island 70 of the sensor die 58 is bonded to the mechanical wafer 69, while frame 56 is not bonded to the mechanical wafer 69. Frame 56 of the sensor wafer 58 is separated from the mechanical wafer 69 by a gap 72 after wafer bonding.

Deep etching of the mechanical wafer 69 is done after bonding of sensor wafer 58 and mechanical wafer 69. DRIE is done from the side two of the mechanical wafer 69 through the whole thickness of this wafer. Areas 62 of the force-transferring element 76 have a layer 63, which serves as a mask in DRIE, while areas 66 do not have such masking layer. As a result of DRIE, parts of mechanical wafers corresponding to areas 66 in FIG. 4c are completely removed and force-transferring elements 76 are formed, as it is shown in FIG. 4d.

FIG. 4d shows completed die after DRIE. Force-transferring element 76 formed from the mechanical wafer is attached to the rigid island 70 through the bonding layer 78. The force-transferring element 76 is not connected to the frame 56 of the sensor die 58.

Second Embodiment

Figure 5:
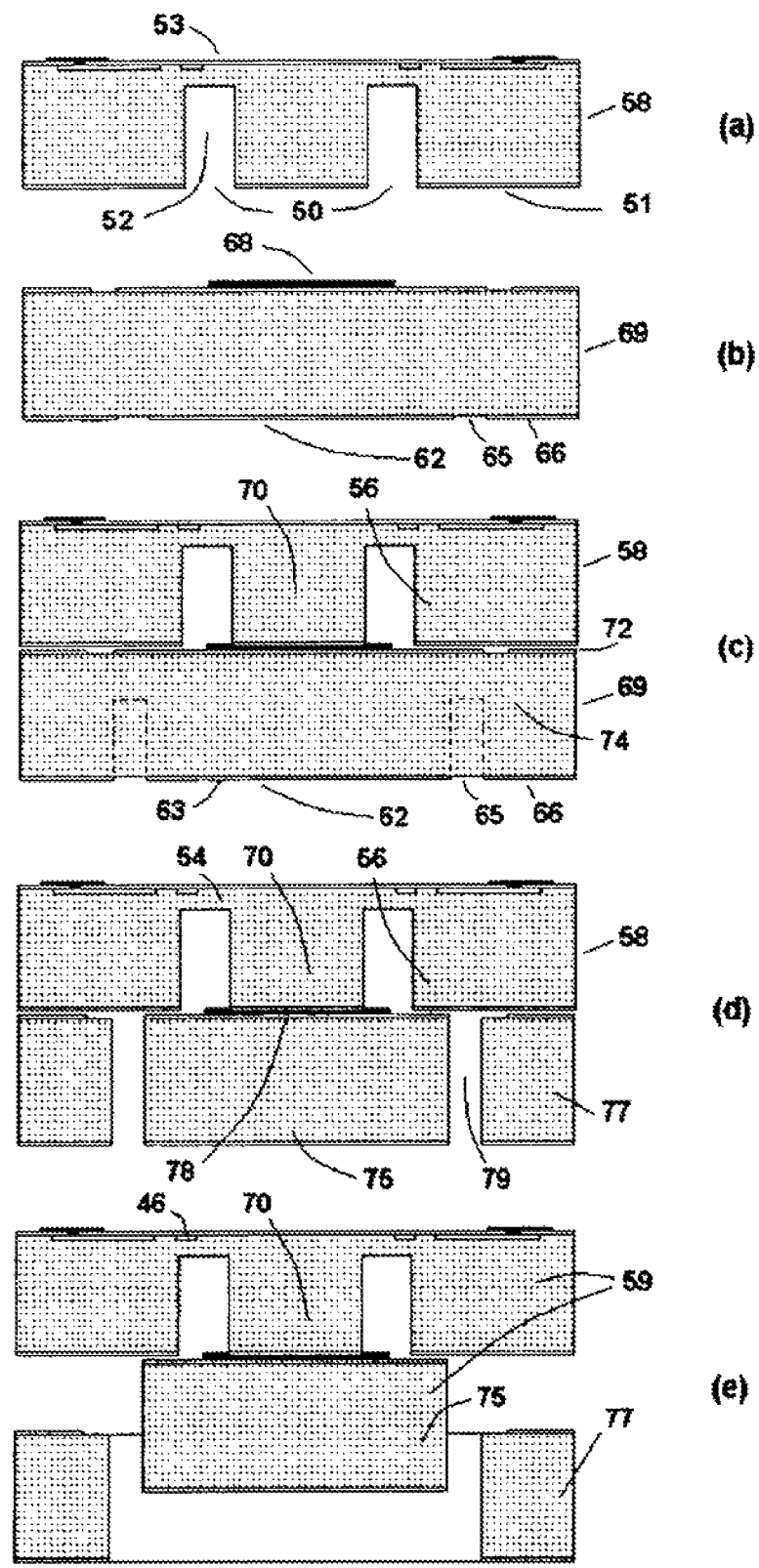
FIG. 5 illustrates a fabrication process back-end, where a second substrate is exposed to deep reactive ion etching after bonding to a first substrate and force-transferring elements are formed within each die area by etching closed trenches separating force-transferring elements and die frames in the second substrate.

FIG. 5a shows first (sensor) wafer 58 after processing steps described above and illustrated by FIG. 2. FIG. 5b shows second (mechanical) wafer 69 after processing steps described above and illustrated by FIG. 3. FIG. 5c shows the two wafers aligned and bonded together. As a result of alignment, rigid island 70 of the sensor die 58 is bonded to the mechanical wafer 69. Frame 56 of sensor die is not bonded to the mechanical wafer 69. It is separated from the mechanical wafer 69 by a gap 72 after wafer bonding.

Deep etching of the mechanical wafer 69 is done after bonding of sensor wafer 58 and mechanical wafer 69. DRIE is done from the side two of the mechanical wafer 69 through the total thickness of this wafer. Areas 62 and 66 have a layer 63, which can serve as a mask in DRIE, while areas 65 separating areas 62 and 66 do not have masking layer. As a result of DRIE, mechanical wafer is etched through, as it is shown in FIG. 5d. FIG. 5d shows force-sensitive die after the DRIE step. Force-sensitive element 75 formed from the mechanical wafer is attached to the rigid island 70 through the bonding layer 78 and not connected to the frame 56 of the sensor die 58. The frame 77 is a part of mechanical wafer that is fully separated from the set of force-transferring elements 75 by trenches 79. However, frame 77 can be connected to the sensor wafer 58 in several areas keeping frame 77 of the mechanical wafer as a part of the wafer stack after bonding for the purpose of easing back-end processing steps after DRIE.

After DRIE through the mechanical wafer 69 is completed, the frame 77 is removed, as it is shown in FIG. 5e. The resulting structure of the force-sensitive die is similar to that shown in FIG. 4d.

The above described approach, where silicon frame 77 is defined at DRIE step and removed later, can provide some additional advantages: stronger mechanical wafer at some back-end steps; better productivity of DRIE process; better control of DRIE process and broader flexibility at dicing.

However, the maximum size of the force-transferring element can be obtained using the process described in the first embodiment. Large size of the force-transferring element can be beneficial both for providing larger sensitivity of the 3D input control device to applied force and better protection of the device from overload by force. These features are discussed in more details later.

Despite of some differences processes described in the first and the second embodiments produce dice with similar structure as it is shown in FIG. 4d and FIG. 5e. These dice can be used in the force input control devices. Force applied to the force-transferring element is transferred to the rigid island 70 and causes stresses in the diaphragm 54, which can be sensed by stress sensitive components 46 and transformed into signals proportional to X, Y, and Z components of the applied force vector.

Third Embodiment

As it is clear from description of the back-end process flow according to the first and second embodiments, DRIE through the whole thickness of mechanical wafer is required after bonding of the sensor wafer and mechanical wafer. Protection of force-transferring element areas and frame areas on the mechanical wafer is provided by a stack of dielectric and/or metal layers deposited and patterned on the side two of the mechanical wafer. These masking layers should withstand long DRIE process. As a result, deposition of thick protection layers on the side two of the mechanical wafer is required. However, deposition of thick protection layers can be difficult and expensive.

Third embodiment addresses these issues related to thickness of DRIE protection layers deposited on the side two of the mechanical wafer. It allows fabrication of the force-sensitive die for input control devices using dielectric or metal layers with much smaller thickness than it would be required in the process according to the first and second embodiments.

Fabrication process for the first (sensor) wafer is the same as it was described in the first embodiment.

Figure 6:
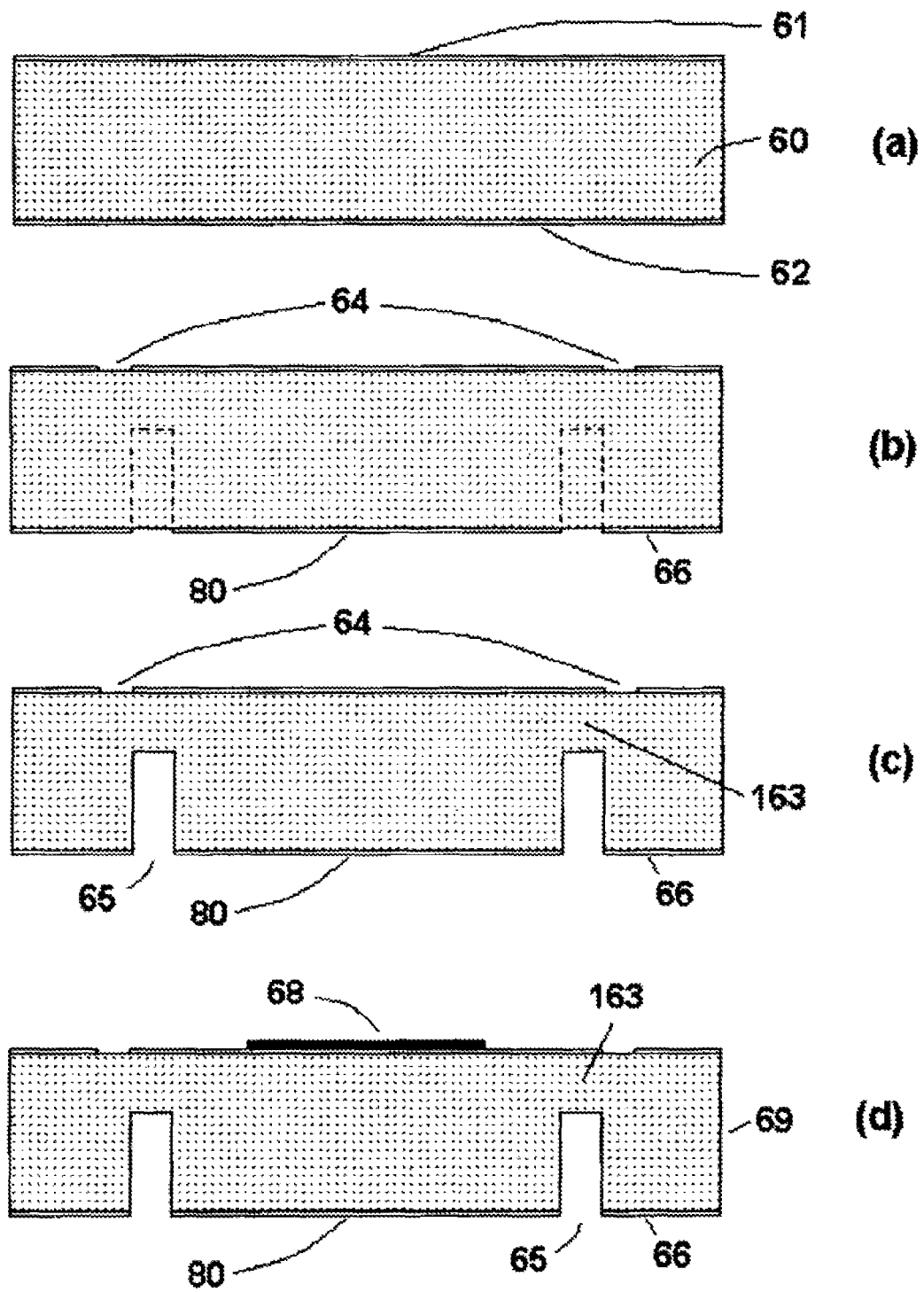
FIG. 6 illustrates a fabrication process of a second (mechanical) substrate with deep reactive ion etching of the second substrate prior to bonding to a first substrate.

FIG. 6 shows an example of a fabrication process of a second substrate or mechanical wafer according to the third embodiment. FIG. 6a shows initial mechanical wafer 60. The mechanical wafer has side one 61 and side two 62.

FIG. 6b shows double-side aligned patterns 64, 66 formed on both sides of the mechanical wafer at the next step.

FIG. 6c shows mechanical wafer after the next step—DRIE from the side two. Pattern for DRIE is defined in such a way that it separates the force-transferring element area 80 and silicon frame 66 area by a closed trench 65. In alternative process variation a pattern opening all die area around force-transferring element 80 is similar to the pattern shown in FIG. 4c. Depth of DRIE is chosen based on several factors, including mechanical strength of the mechanical wafer after DRIE, thickness of the protection layer 62 on the side two of the mechanical wafer and its masking properties in DRIE.

The lithography, which defines pattern on the side two of the mechanical wafer, as it shown in FIG. 6b, is used to define the DRIE pattern; and both etching of protection layers on the side two of the mechanical wafer and DRIE are done using the same mask. After DRIE the remaining thickness of area 163 is only 50-250 μm. These areas 163 can be etched through later in the process using a standard thickness of dielectric layer 80, as a mask, on the side two of the mechanical wafer.

FIG. 6d shows the mechanical wafer after next processing step. Bonding material 68 is deposited on the side one of the wafer. In one version the bonding material is deposited everywhere on the side one of the wafer and patterned after that. Some other options for patterning of the bonding material have been discussed in the description of the first embodiment.

After this step the mechanical wafer 69 is ready for the back-end process.

Figure 7:
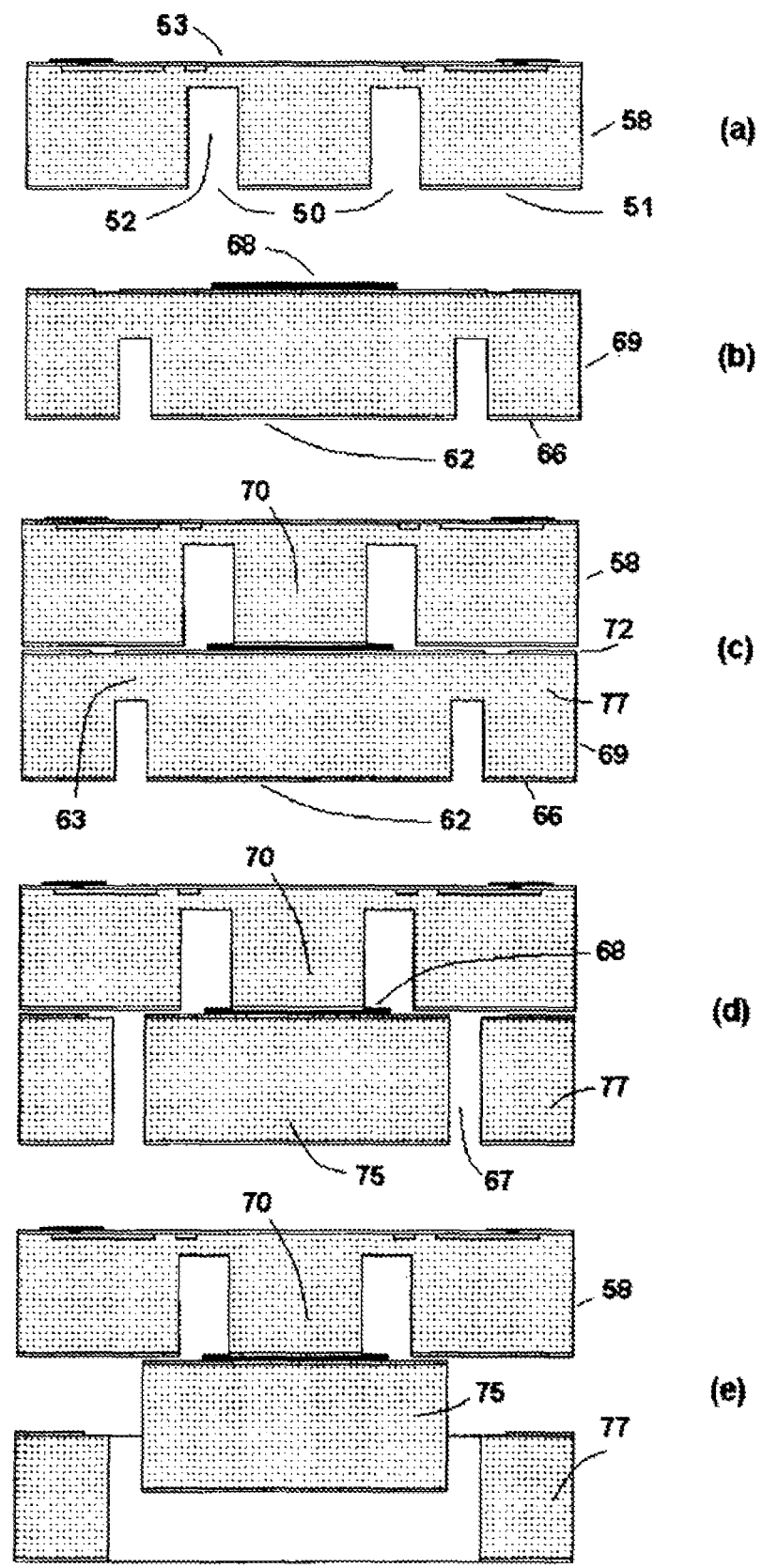
FIG. 7 illustrates a fabrication process back-end using a second (mechanical) substrate with a profile formed by deep reactive ion etching prior to bonding to a first substrate.
Figure 8:
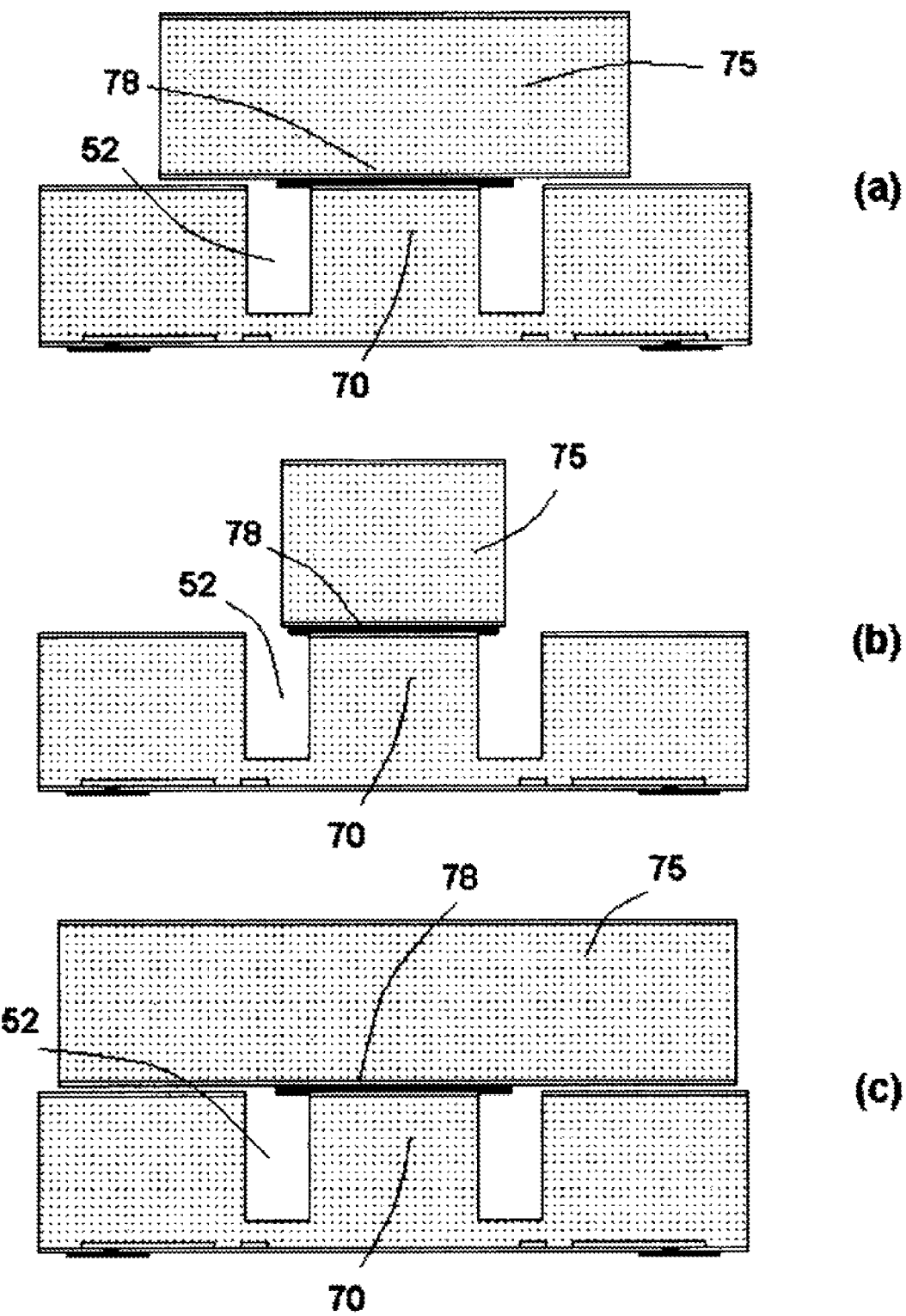
FIG. 8 illustrates a completed die with different shapes of force-transferring elements fabricated by deep reactive ion etching of a second (mechanical) substrate prior to bonding to a first substrate.

FIG. 7 shows an example of a fabrication process back-end according to the third embodiment. FIG. 7a shows first (sensor) wafer 58 after processing steps described above and illustrated by FIG. 2. FIG. 7b shows second (mechanical) wafer 69 after processing steps described above and illustrated by FIG. 6. FIG. 7c shows the two wafers aligned and bonded together. As a result of alignment, rigid islands 70 of the sensor wafer 58 are bonded to the mechanical wafer 69, while frame 77 is not bonded to the mechanical wafer 69. Frame 77 of the sensor wafer 58 is separated from the mechanical wafer 68 by a gap 72 after the wafer bonding.

The final DRIE of the mechanical wafer 69 is done from the side two of the mechanical wafer 69 through the remaining thickness of the areas 63. Areas 62 and areas 66 have a mask layer, which can protect these areas in DRIE, while bottoms of areas 63 do not have such masking layer. As a result, areas 63 in mechanical wafers are etched through.

FIG. 7d shows force-sensitive die after the DRIE step. Force-transferring element 75 formed from the mechanical wafer is attached to the rigid island 70 through the bonding layer 68. The force-transferring element 75 is not connected to the frame 77 of the sensor die. The frame 77 is a part of mechanical wafer that is fully separated from the set of force-transferring elements 75 by closed trenches 67.

After DRIE of the mechanical wafer, separating force-transferring elements 75 and frame 77 is completed, the frame 77 is removed, as it shown in FIG. 7e.

FIGS. 8-11 show examples of completed die with different shapes of force-transferring elements, as a result of one of the processes described in the first, second, and third embodiments.

FIG. 8a shows a force-sensitive die with force-transferring element 75 bonded to the rigid island 70 of the sensor die with a bonding layer 78. The force-transferring element 75 covers completely both the area of the rigid island 70 and deep trench 52 around it.

FIG. 8b shows a force-sensitive die with force-transferring element 75, which does not cover the area of deep trench 52 around the rigid island 70.

FIG. 8c shows a force-sensitive die with force-transferring element 75, which almost completely covers the sensor die.

Figure 9:
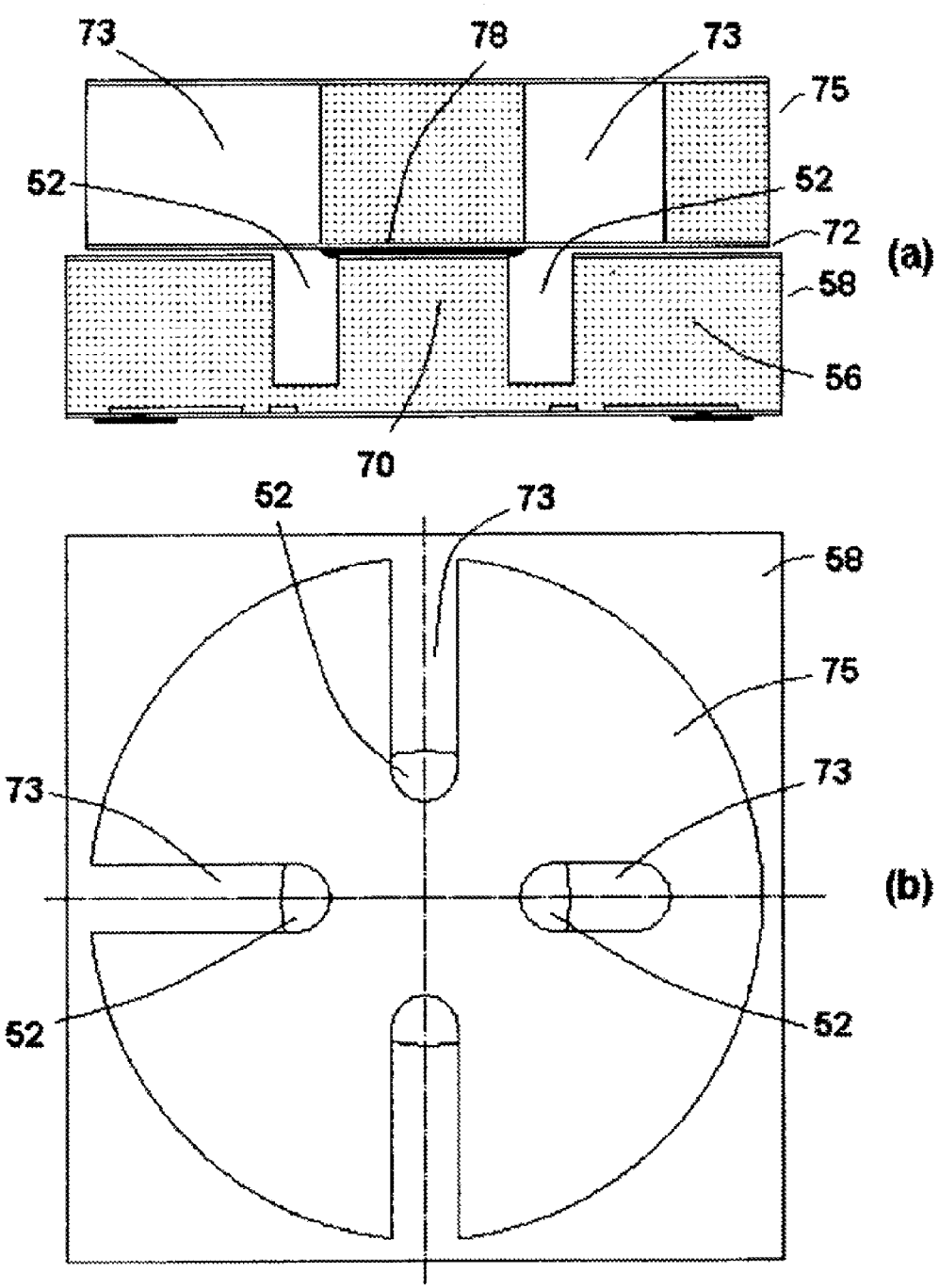
FIG. 9 illustrates a completed force-sensitive die with a force-transferring element having slots providing access to the trench around the rigid island in the sensor die.

FIG. 9 shows a force-sensitive die with force-transferring element 75 bonded to the rigid island 70 of the sensor die with a bonding layer 78. The force-transferring element 75 has a rounded cylindrical shape with slots 73 that allow access to the closed trenches 52 formed in the sensor die 58 around rigid islands 70.

Figure 10:
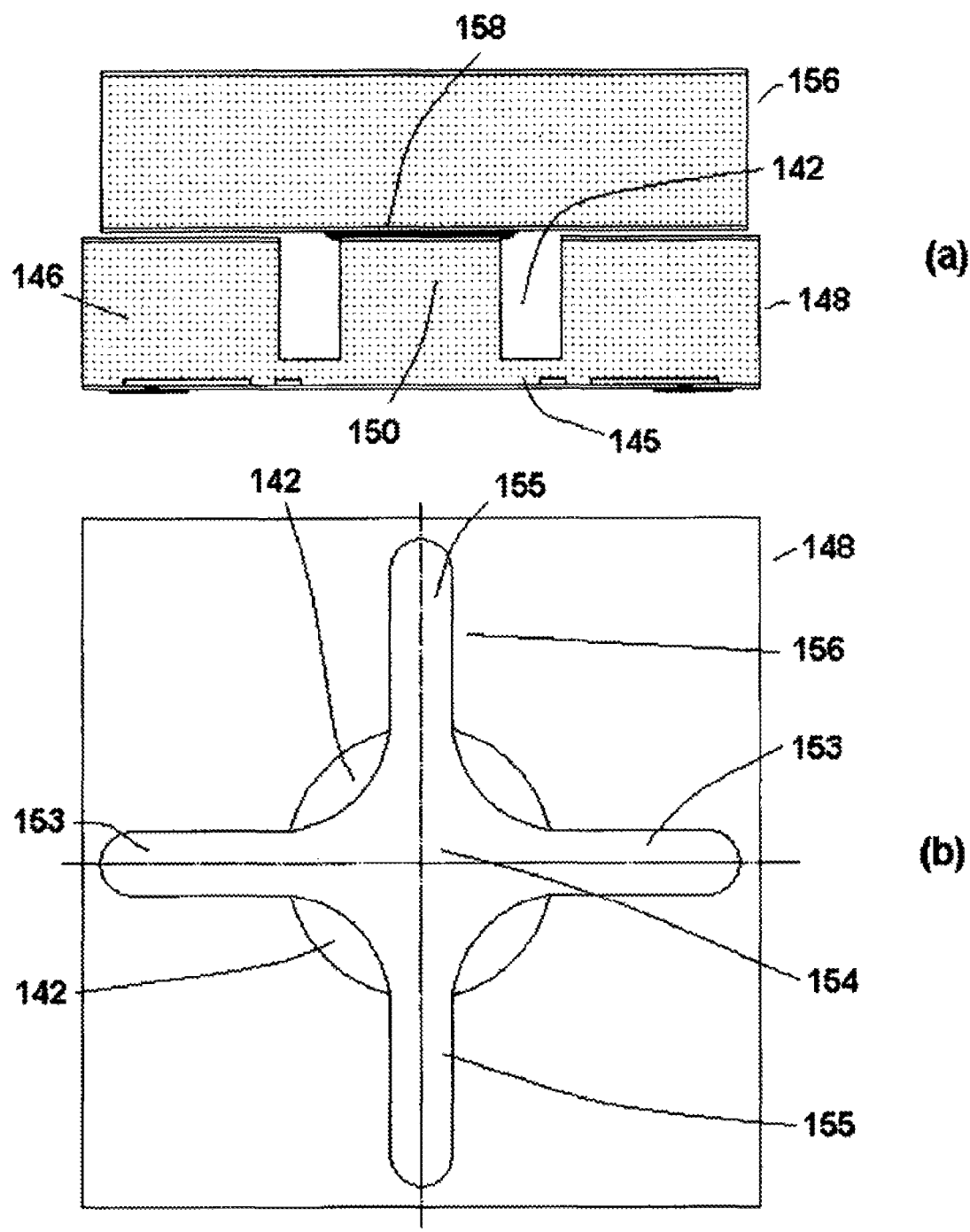
FIG. 10 illustrates a completed force-sensitive die with a star shape of the force-transferring element.

FIG. 10 shows a force-sensitive die with force-transferring element 156 bonded to the rigid island 150 of the sensor die with a bonding layer 158. The force-transferring element has a cross shape.

FIGS. 11a-d show force-sensitive dice with force-transferring elements 156 bonded to the rigid islands 150 of the sensor die 148. In FIG. 11a the force-transferring element 156 has a cross shape. In FIG. 11b the force-transferring element 156 has a steering wheel shape with three spokes 151, 152 between the rim 157 of the wheel and central part 154 connected to the rigid island 150. Force-transferring element 156 shown in FIG. 11c has a steering wheel shape with multiple spokes 151, 152. FIG. 11d shows elliptical shape of the rim 157 with four spokes 153, 155 of different length.

All these different shapes of the force-transferring element can be fabricated with the processes described in the above embodiments.

Fourth Embodiment

Methods of fabrication of force-sensitive die described in the first, second, and third embodiments require deposition of the bonding material on the second (mechanical) substrate.

Figure 12:
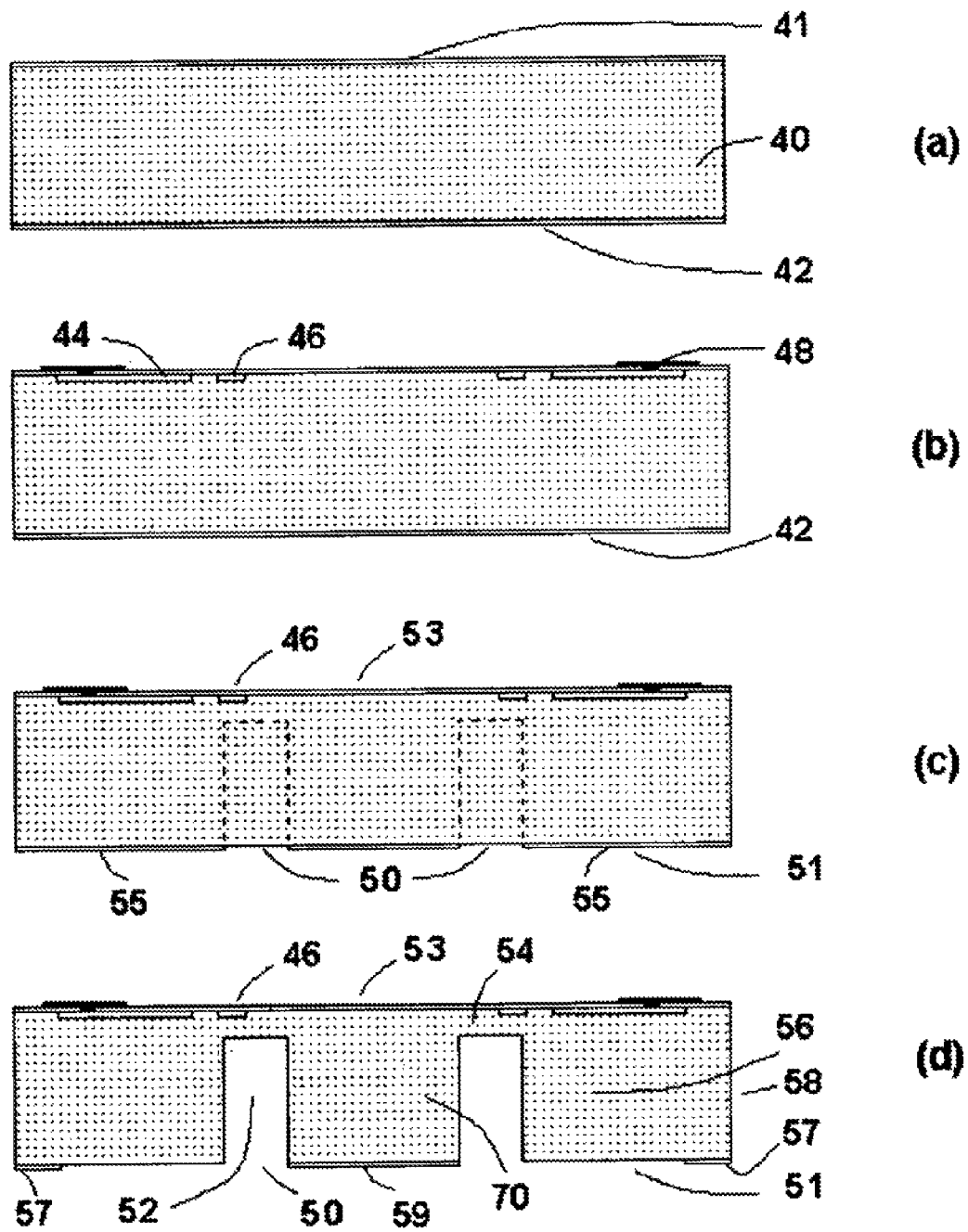
FIG. 12 illustrates a fabrication process of a first (sensor) substrate.
Figure 13:
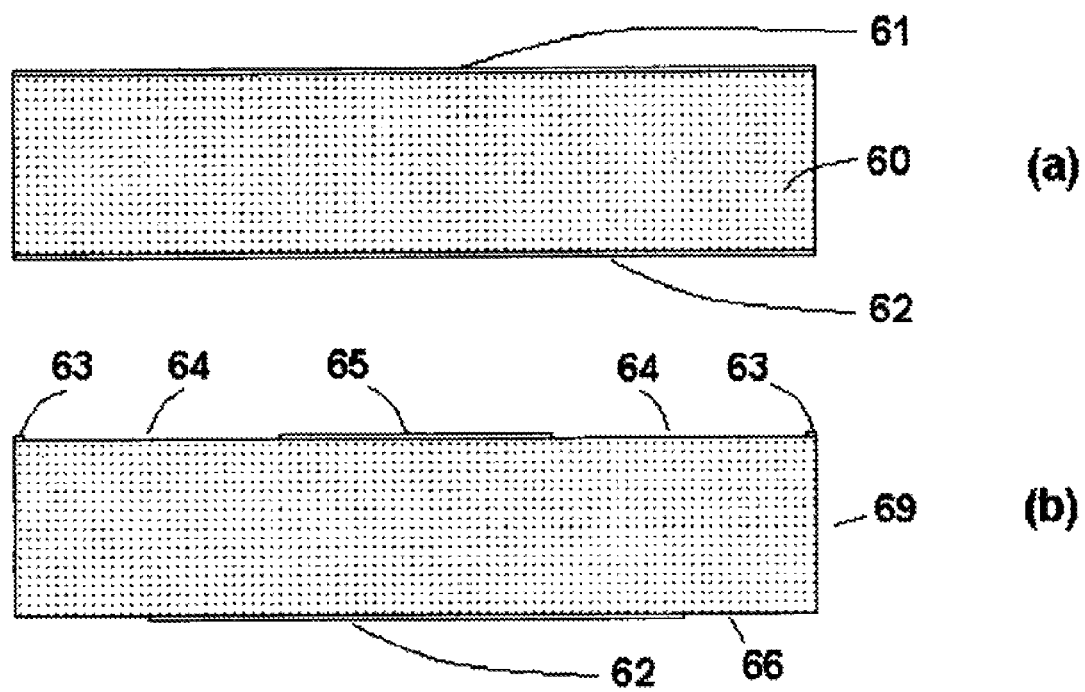
FIG. 13 illustrates a fabrication process of a second (mechanical) substrate without deep etching and prior to bonding with a first substrate.
Figure 14:
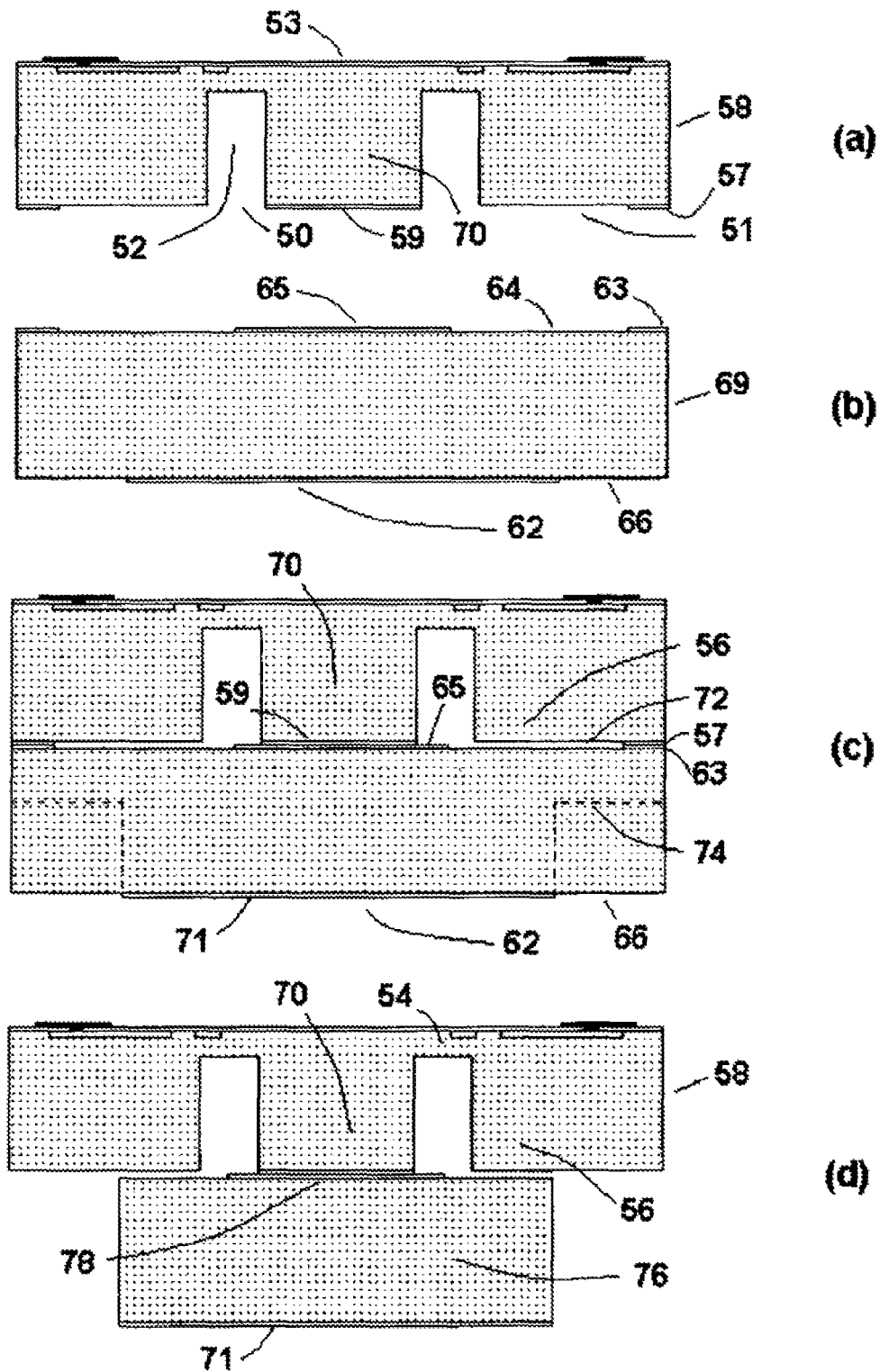
FIG. 14 illustrates a fabrication process back-end, where first and second substrates are bonded using direct bonding.

FIGS. 12, 13 and 14 illustrate another fabrication method, which doesn't require deposition of the bonding material.

FIG. 12a shows initial wafer 40. Initial material for the sensor wafer is chosen based on requirements for both fabrication of IC components and direct bonding step. Sensor wafer has a side one 41 and side two 42.

FIG. 12b shows sensor wafer after IC circuits 44, 46 are fabricated on the side one.

Micromachining of the sensor wafer is done after fabrication of IC circuits on the side one of the sensor wafer is completed. FIG. 12c shows a pattern 50 for deep etching defined on the side two of the sensor wafer. Patterns 50 on the side two 51 are aligned to some patterns on the side one 53 of the sensor wafer to provide alignment of stress-sensitive components 46 with the patterns 50 for deep etching. Besides, some areas, where bonding with the mechanical substrate is not needed, are processed to prevent bonding in these areas. For example, thermal oxide is removed from part of the areas 55 and remains only in areas 57. In other version of the process the thermal oxide layer is removed from corresponding portions on the side one of the second substrate.

FIG. 12d shows completed sensor wafer 58 after deep etching from the side two 51. Deep etching is done using deep reactive ion etching (DRIE). Cavities 52 are formed on the side two of the sensor wafer, as a result of this step. The cavities define elastic elements, for example diaphragms 54 and rigid island 70 in the center of the diaphragm 54. Stress-sensitive components 46 are located within or close to the diaphragm areas 54.

FIG. 13 shows processing of the mechanical wafer according to the forth embodiment. FIG. 13a shows initial wafer 60, which has side one 61 and side two 62. Initial material for the mechanical wafer can be chosen based on requirements for both fabrication of mechanical structure of the force input control device and direct bonding step.

Combination of dielectric and metal layers is deposited on the side two of the mechanical wafer 69. These layers are used as a mask for DRIE.

FIG. 13b shows patterns 64, 66 formed on both sides of the mechanical wafer 69 at the next step. The patterns 64 and 66 are aligned to each other.

FIG. 14 shows an example of a fabrication process back-end according to the fourth embodiment. FIG. 14a shows sensor wafer 58 after processing steps described above and illustrated by FIG. 12. FIG. 14b shows mechanical wafer 69 after processing steps described above and illustrated by FIG. 13. FIG. 14c shows the two wafers aligned and bonded together using direct oxide bonding. As a result, rigid island 70 of the sensor die 58 is bonded to the mechanical wafer 69 in the areas 59 and 65, and frame 56 is bonded to the mechanical wafer 60 in areas 63 and 57. In other areas frame 56 of the sensor wafer 58 is separated from the mechanical wafer 69 by a gap 72 after wafer bonding.

Deep etching of the mechanical wafer 69 is done after bonding of the sensor and mechanical wafers. DRIE is done from the side two of the mechanical wafer 69 through the whole thickness of this wafer. Side two of the force-transferring element 76 has a protection layer 71, which serves as a mask in DRIE, while areas 66 do not have such masking layer. As a result of DRIE, parts of mechanical wafers corresponding to areas 66 in FIG. 14c are completely removed and force-transferring elements 76 are formed as it is shown in FIG. 14d.

FIG. 14d shows completed die after DRIE. Force-transferring element 76 formed from the mechanical wafer is attached to the rigid island 70 through the bonding layer 78. The force-transferring element 76 is not connected to the frame 56 of the sensor die 58.

Fifth Embodiment

Force-sensitive die fabrication process described in the above embodiments requires DRIE through the whole thickness of the mechanical wafer either in one or two steps. DRIE requires expensive equipment and allows processing of only one wafer at a time. Process time also can be quite long creating a bottleneck in volume production. Multiple etching tools can be required increasing cost of force-sensitive die for input control devices.

Figure 15:
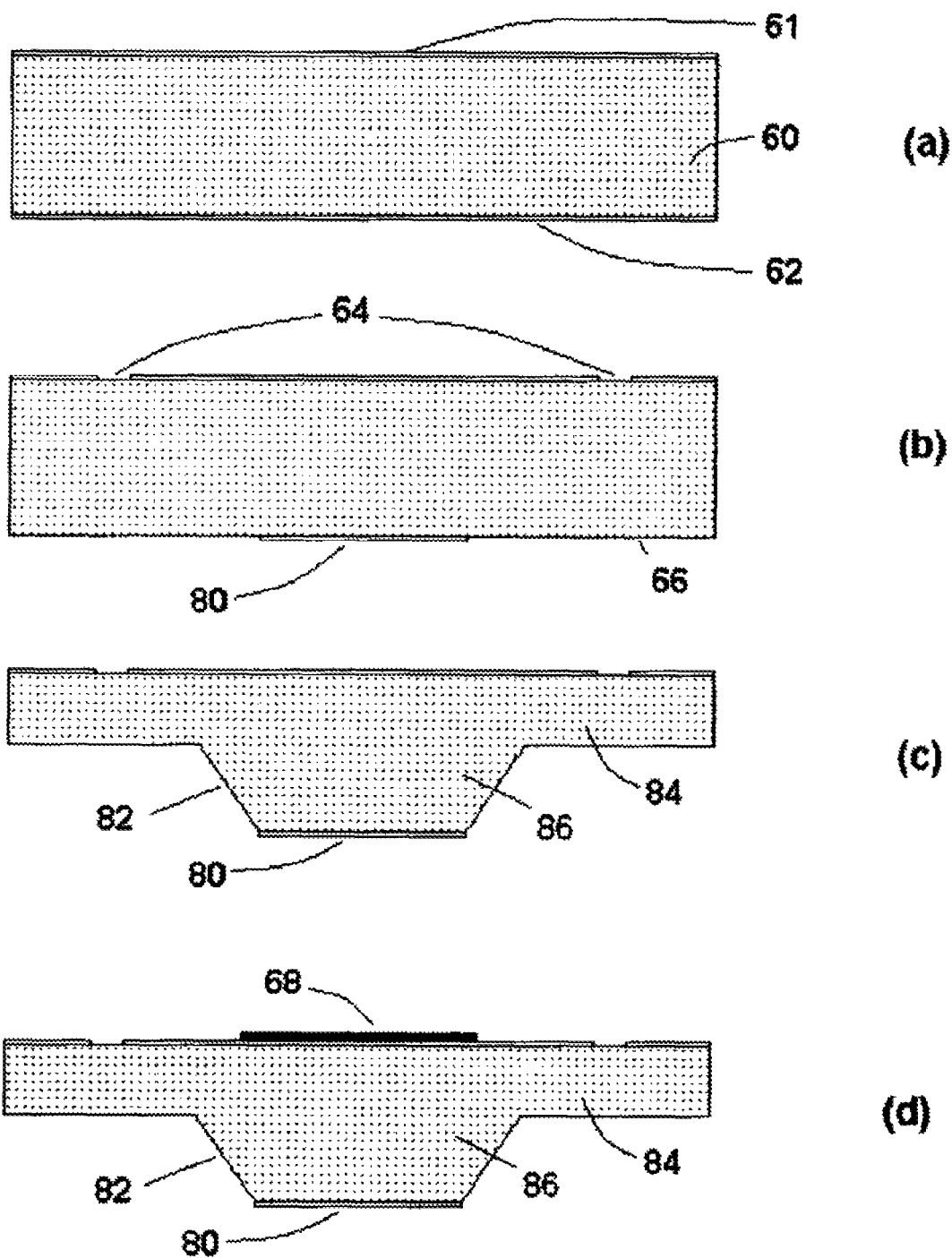
FIG. 15 illustrates a fabrication process of a second (mechanical) substrate utilizing deep wet anisotropic etching of the side two of the second substrate.
Figure 16:
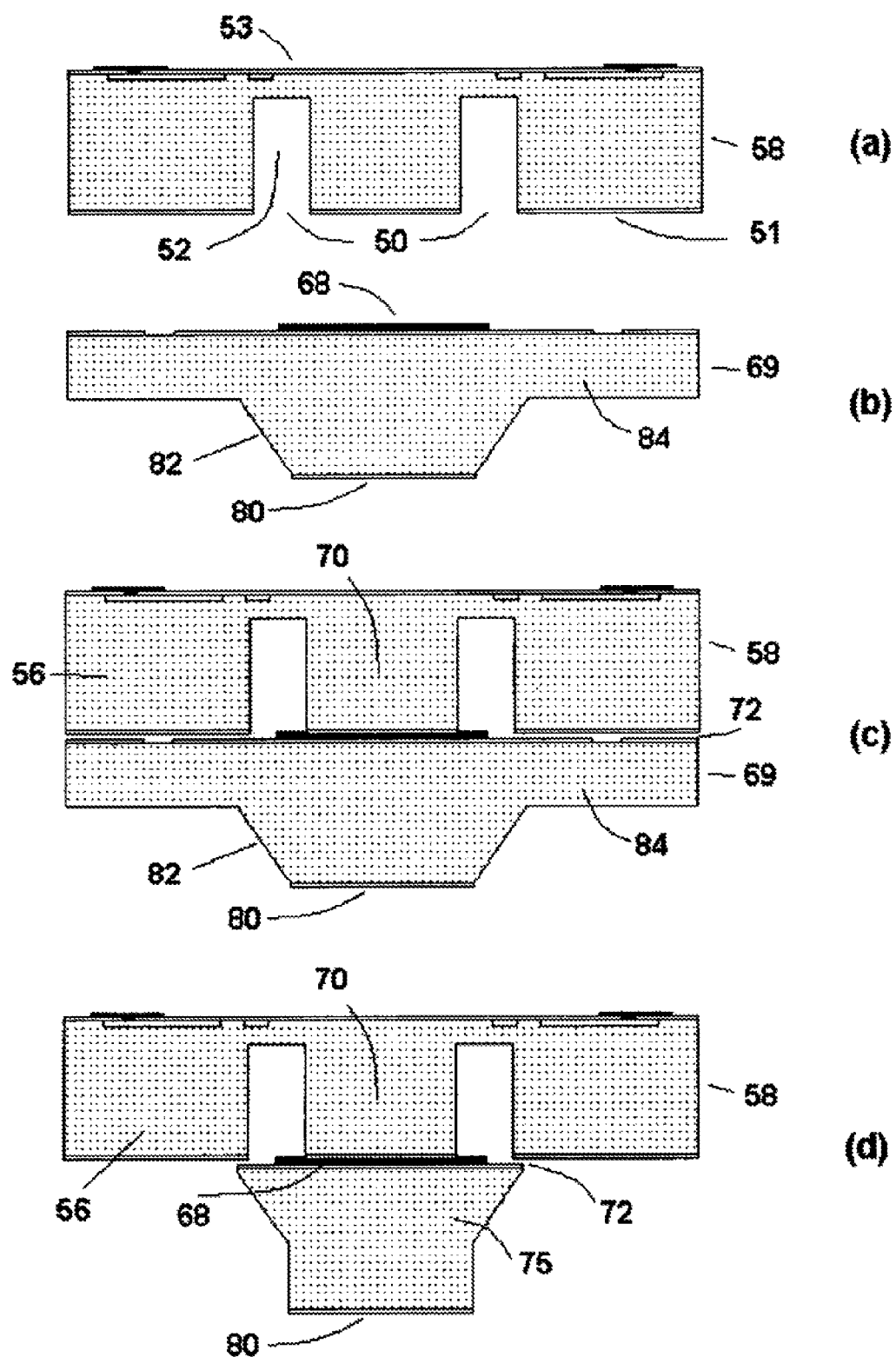
FIG. 16 illustrates a fabrication process back-end using a second (mechanical) substrate with profile formed by deep wet anisotropic etching prior to bonding to a first substrate and completing the process with DRIE.
Figure 17:
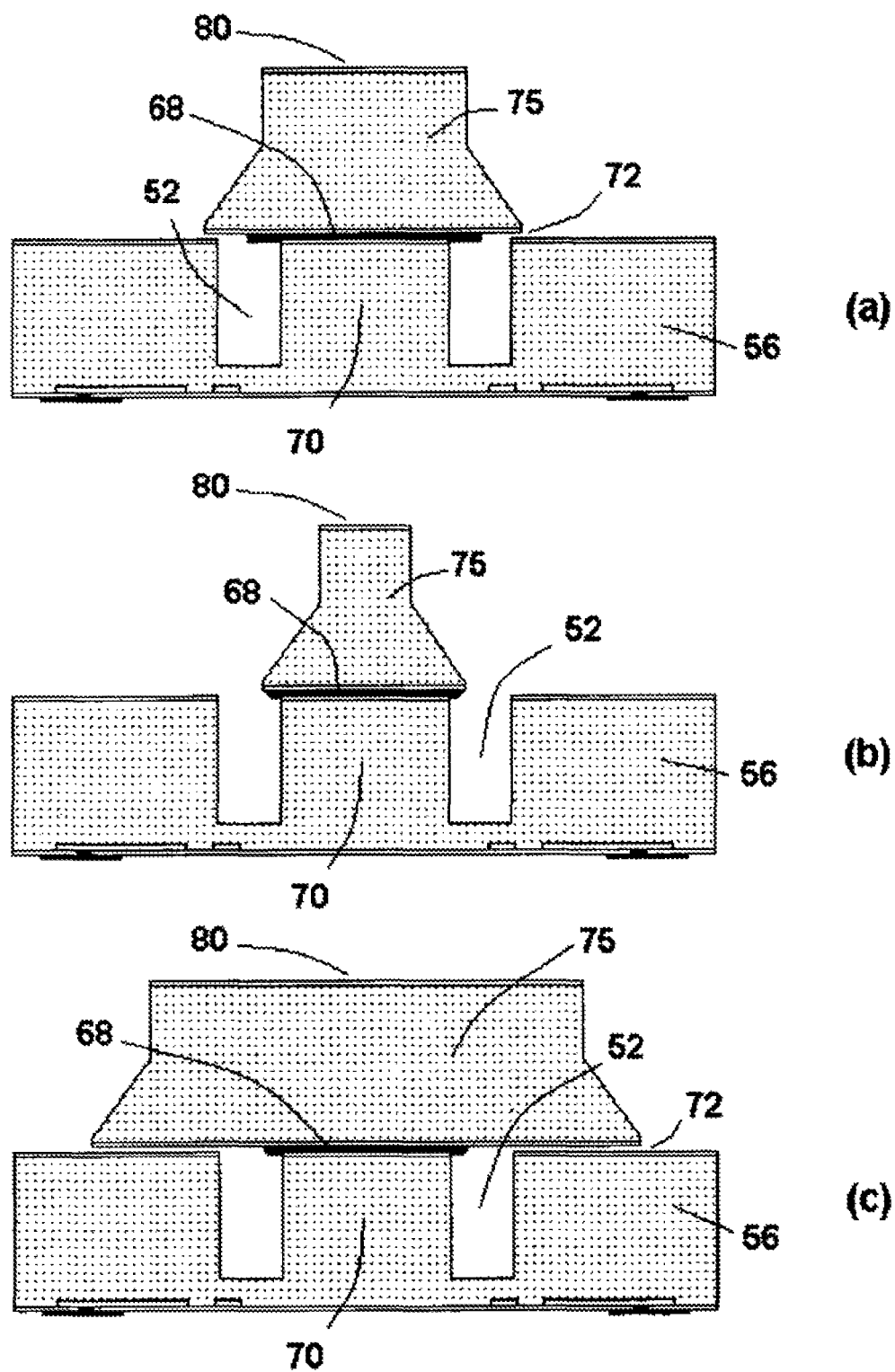
FIG. 17 illustrates completed die with different shapes of force-transferring elements fabricated by a combination of wet anisotropic etching and deep reactive ion etching of a second (mechanical) substrate prior to bonding to a first substrate.

FIGS. 15, 16 and 17 illustrate the fabrication method, which simplifies the process and decrease its cost by including a wet anisotropic etching, as a part of the deep etching of mechanical wafer.

Fabrication process for the first wafer is similar to the first embodiment.

FIG. 15 shows an example of a fabrication process of the mechanical wafer according to the fifth embodiment. FIG. 15a shows initial mechanical wafer 60. The mechanical wafer has side one 61 and side two 62.

FIG. 15b shows double-side aligned patterns 64, 66 formed on both sides of the mechanical wafer at the next step. The patterns 64 and 66 are aligned to each other. One or more layers, which serve as a mask during wet anisotropic etching of silicon, are deposited on the mechanical wafer. In one of the versions mechanical wafer is thermally oxidized, then LPCVD nitride is deposited on both sides of the mechanical wafer. Lithography on the side one 61 of the mechanical wafer is done first and pattern 64 is defined. Then lithography on the side two 62 of the mechanical wafer is done and a pattern for wet anisotropic etching is defined, as it shown in FIG. 15b.

In another version of the process a pattern separating force-transferring element area 80 and silicon frame by a closed trench similar to the patterns shown in FIG. 6b also is defined.

FIG. 15c shows mechanical wafer after the next step—wet anisotropic etching. Etching depth is chosen based on several factors, including strength of the mechanical wafer after wet anisotropic etching, thickness of the protection layer 62 on the side two of the mechanical wafer and its masking properties in DRIE that will be used later.

The remaining thickness of the areas 84 after wet anisotropic etching is usually in the range of 50-250 μm. These areas 84 will be etched through later in the process.

FIG. 15d shows the mechanical wafer after next processing step. Bonding material 68 is deposited on the side one of the wafer.

FIG. 16 shows an example of a fabrication process back-end according to the fifth embodiment. FIG. 16a shows first (sensor) wafer 58 after processing steps described above and illustrated by FIG. 2. FIG. 16b shows second (mechanical) wafer 69 after processing steps described above and illustrated by FIG. 15.

FIG. 16c shows the two wafers aligned and bonded together. As a result of alignment, rigid island 70 of the sensor die 58 is bonded to the mechanical wafer 69, while the frame 56 is not bonded to the mechanical wafer 69.

DRIE etching of the mechanical wafer 69 is done after bonding of sensor and mechanical wafers. DRIE is done from the side two of the mechanical wafer 69 through the remaining thickness of the areas 84. As a result of DRIE, areas 84 in mechanical wafers are completely removed.

FIG. 16d shows force-sensitive die after the DRIE step. As it can be seen from FIG. 16d, force-transferring element 75 has vertical walls at the side adjacent to the side two of the mechanical wafer and pyramidal shape at the side bonded to the sensor wafer. Force-transferring element 75 formed from the mechanical wafer is attached to the rigid island 70 through the bonding layer 68. The force-transferring element 75 is not connected to the frame 56 of the sensor die 58.

FIG. 17 shows examples of completed force-sensitive die with different shapes of force-transferring elements fabricated using a process described in the fifth embodiment.

FIG. 17a shows a force-sensitive die with force-transferring element 75, which covers completely the area of the rigid island 70 and deep trench 52 around it and separated by a gap 72 from the frame 56 of the sensor die.

FIG. 17b shows a force-sensitive die with force-transferring element 75, which does not cover the area of deep trench 52 around the rigid island 70.

FIG. 17c shows a force-sensitive die with force-transferring element 75, which almost completely covers the entire sensor die.

Sixth Embodiment

Sixth embodiment discloses another option for fabrication of mechanical wafer using process that combines DRIE and wet anisotropic etching and, therefore, allows decreasing cost of the force-sensitive die.

Fabrication process for the sensor wafer is the same as in the first embodiment.

Figure 18:
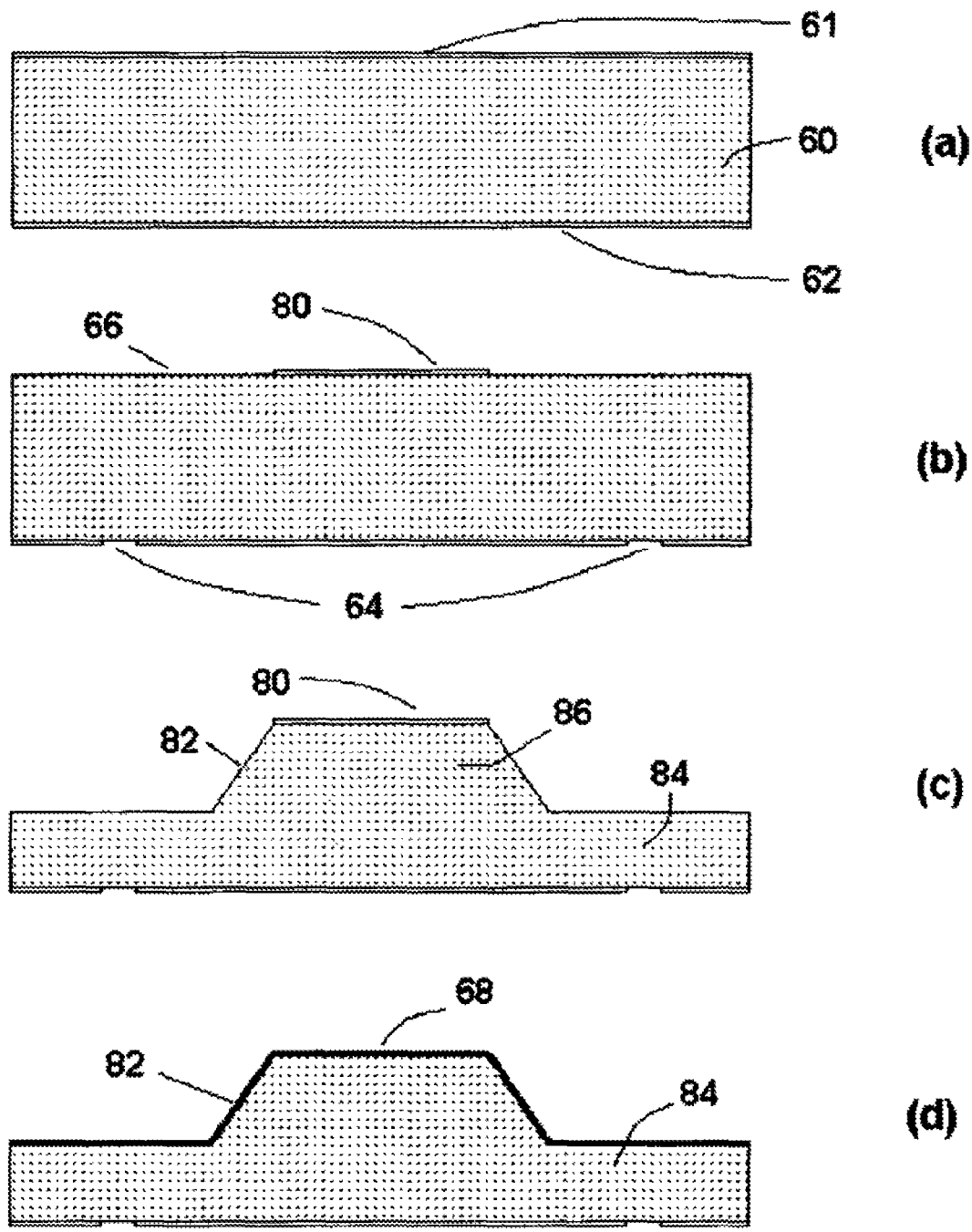
FIG. 18 illustrates a fabrication process of a second (mechanical) substrate utilizing deep wet anisotropic etching from the side one.

FIG. 18 shows an example of a fabrication process of the mechanical wafer according to the sixth embodiment. FIG. 18a shows initial mechanical wafer 60. The mechanical wafer has side one 61 and side two 62.

FIG. 18b shows double-side aligned patterns 64, 66 formed on both sides of the mechanical wafer at the next step.

FIG. 18c shows mechanical wafer after the next step—wet anisotropic etching. Etching depth is chosen based on the same factors, which were used for the mechanical wafer described in the fifth embodiment.

FIG. 18d shows the mechanical wafer after next processing step. Bonding material 68 is deposited on the profiled side one of the wafer.

Figure 19:
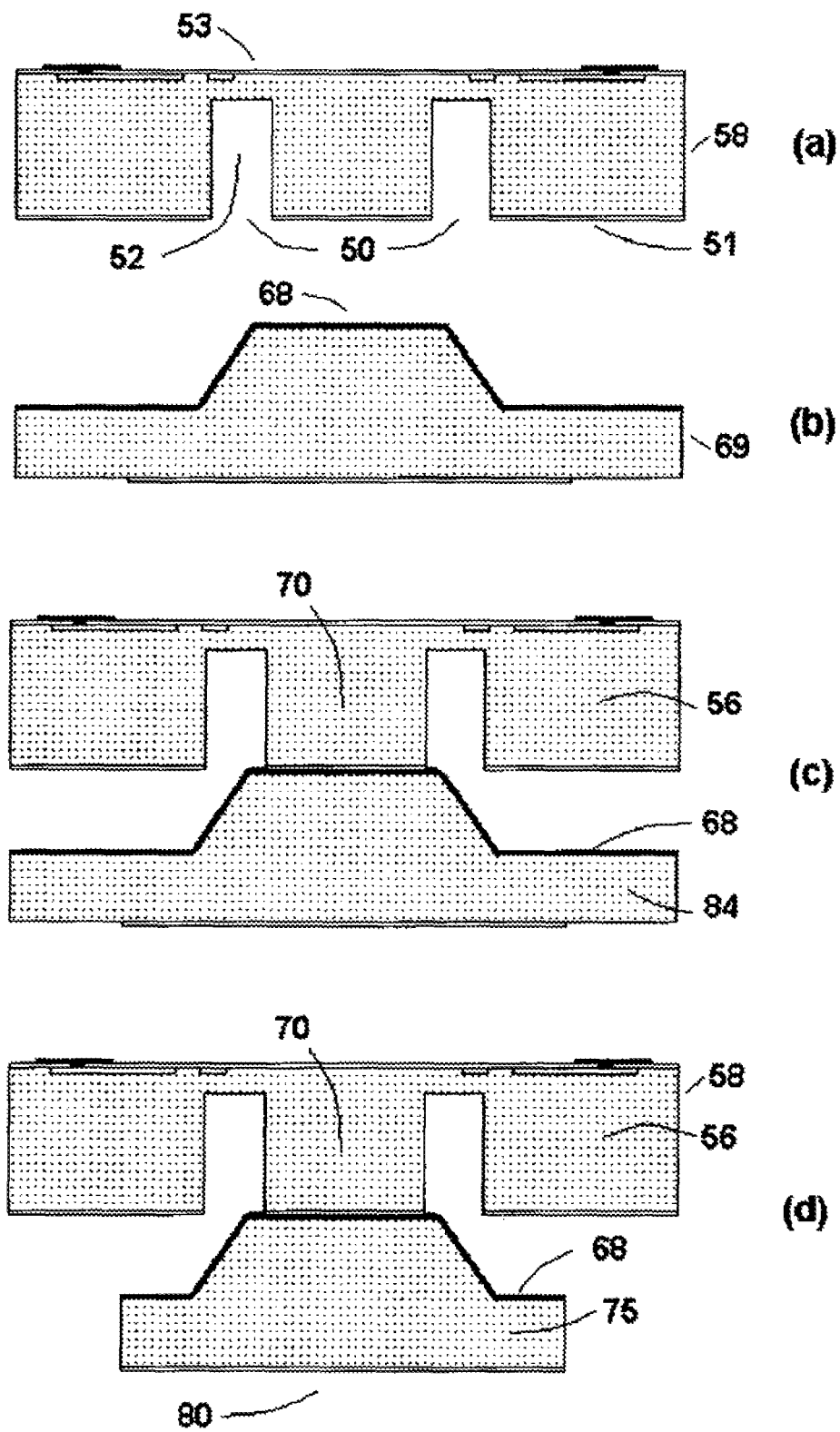
FIG. 19 illustrates a fabrication process back-end using a second (mechanical) substrate with profile formed by deep wet anisotropic etching from the side one prior to bonding to a first substrate and completing the process with DRIE from the side two of the second substrate.

FIG. 19 shows an example of a fabrication process back-end according to the sixth embodiment. FIG. 19a shows sensor wafer 58 after processing steps described above and illustrated by FIG. 2. FIG. 19b shows mechanical wafer 69 after processing steps described above and illustrated by FIG. 18.

FIG. 19c shows the two wafers aligned and bonded together. As a result of alignment, rigid island 70 of the sensor die 58 is bonded to the mechanical wafer 69, while frame 56 is not bonded to the mechanical wafer 69.

DRIE etching of the mechanical wafer 69 is done after bonding of the sensor and mechanical wafers from the side two of mechanical wafer 69 through the remaining thickness of the areas 84.

FIG. 19d shows force-sensitive die after the DRIE step. As it can be seen from FIG. 19d, force-transferring element 75 has a mushroom shape with vertical walls at the side adjacent to the side two of the mechanical wafer and pyramidal shape at the side bonded to the sensor wafer. Force-transferring element 75 formed from the mechanical wafer is attached to the rigid island 70 through the bonding layer 68. The force-transferring element 75 is not connected to the frame 56 of the sensor die 58.

Seventh Embodiment

Fabrication process for the sensor wafer is the same as in the first embodiment.

Figure 20:
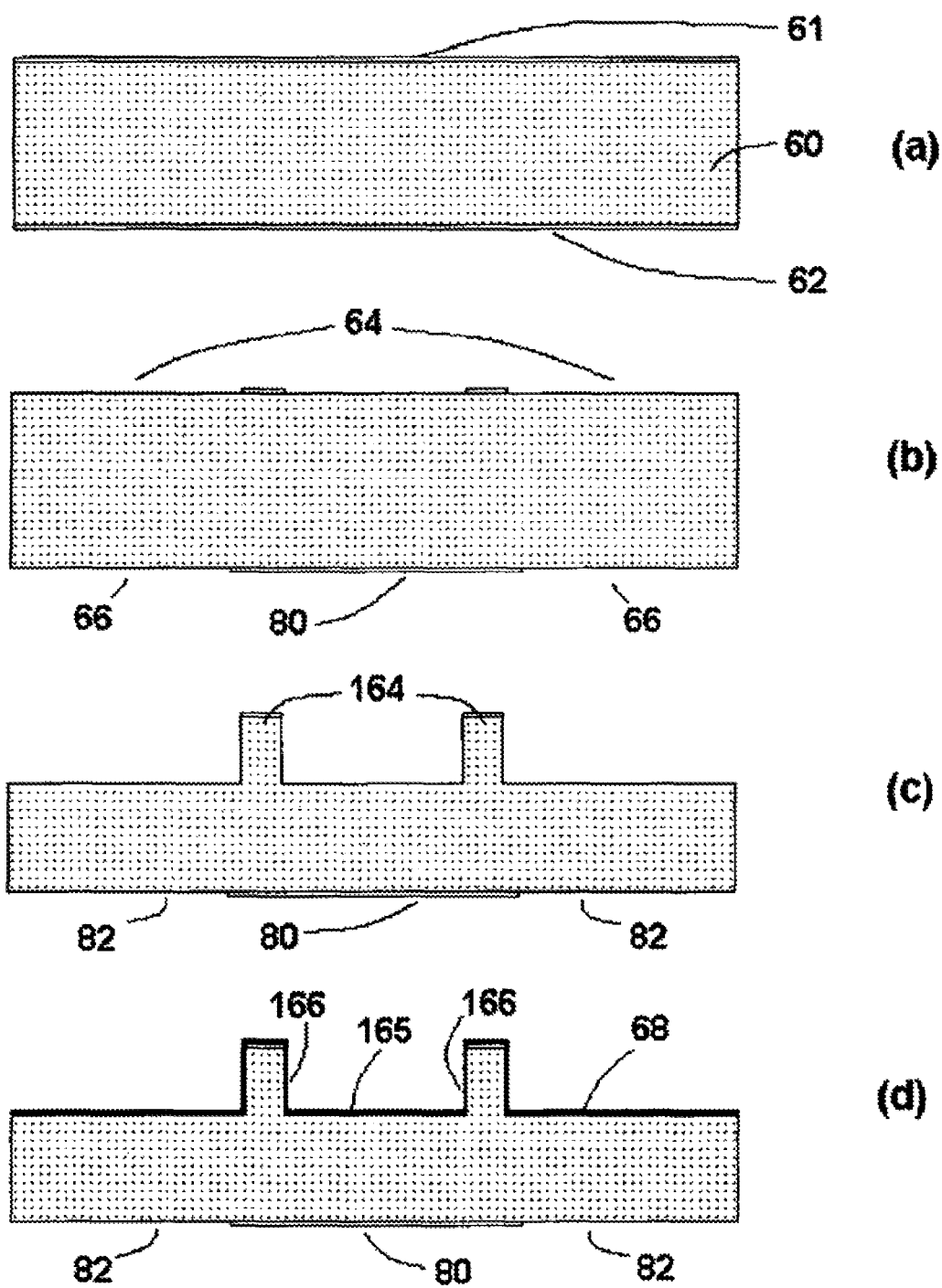
FIG. 20 illustrates a fabrication process of a second (mechanical) substrate utilizing reactive ion etching from side one.

FIG. 20 shows an example of a fabrication process of the mechanical wafer according to the seventh embodiment. FIG. 20a shows initial mechanical wafer 60. The mechanical wafer has side one 61 and side two 62.

FIG. 20b shows double-side aligned patterns 64, 66 formed on both sides of the mechanical wafer at the next step.

FIG. 20c shows mechanical wafer after the next step—micromachining of its side one. Profile shown in FIG. 20c is formed with DRIE. Other methods of etching can be used as well. Etching depth is chosen based on the several factors, including mechanical strength of the profile 164 formed on the mechanical wafer after DRIE, thickness of the protection layer on the side one of the mechanical wafer and its masking properties in the etching process. As it can be seen from FIG. 20c, mesa structures 164 have vertical side walls.

FIG. 20d shows the mechanical wafer after next processing step. Bonding material 68 is deposited on the patterned side one of the wafer.

The bonding layer 68 is thick enough to allow bonding with the rigid island of the sensor wafer either on the surfaces 165, or 166, or on both. Bonding material covers all side one of the mechanical wafer. In alternative process, it is patterned.

Figure 21:
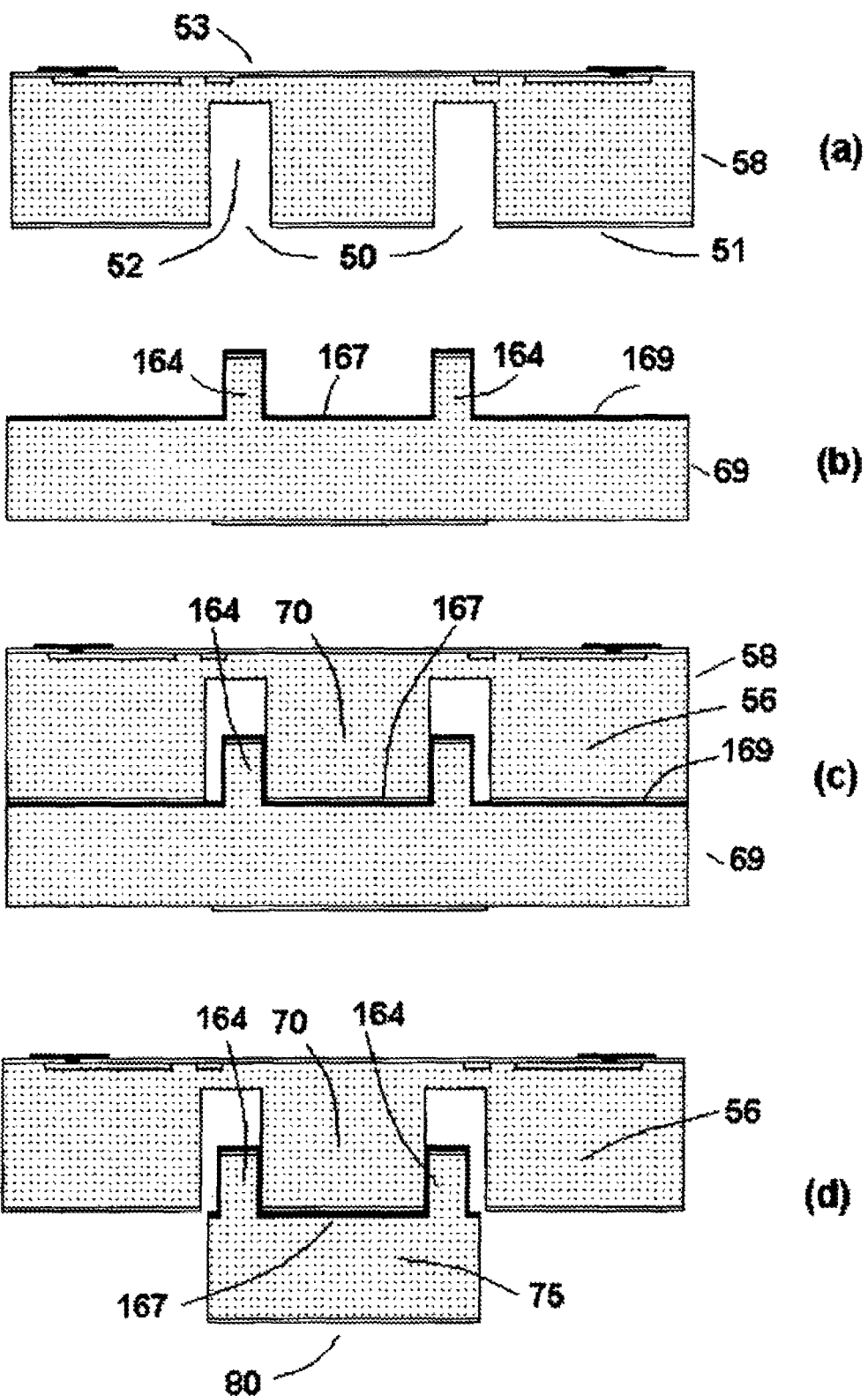
FIG. 21 illustrates a fabrication process back-end using a second (mechanical) substrate profiled with reactive ion etching from side one prior to bonding to a first substrate and completing the process with DRIE from side two of the second substrate.

FIG. 21 shows an example of a fabrication process back-end according to the seventh embodiment. FIG. 21a shows sensor wafer 58 after processing steps described above and illustrated by FIG. 2. FIG. 21b shows mechanical wafer 69 after processing steps described above and illustrated by FIG. 20.

FIG. 21c shows the two wafers aligned and bonded together. As a result of alignment, rigid island 70 of the sensor die 58 is bonded to the area 164 and 167 in the mechanical wafer 69 and frame 56 of the sensor die is also bonded to the areas 169 of the mechanical wafer 69.

DRIE etching of the mechanical wafer 69 is done after bonding of the sensor and mechanical wafers. DRIE is done from the side two of the mechanical wafer 69 through the whole thickness of the mechanical wafer. Bonding material exposed after DRIE through the whole thickness of mechanical wafer is removed if necessary.

FIG. 21d shows force-sensitive die after the DRIE step. As it can be seen from FIG. 21d, force-transferring element 75 has vertical walls. Rigid island 70 of the sensor wafer is attached to the force-transferring element 75 both in the area 167 on the side two of the sensor wafer and on the side walls, where it is attached to the mesa structures 164. As a result of DRIE, portions of the mechanical wafer attached to the frame of the sensor wafer are completely removed and remaining force-transferring elements are not connected to the frame 56.

Figure 22:
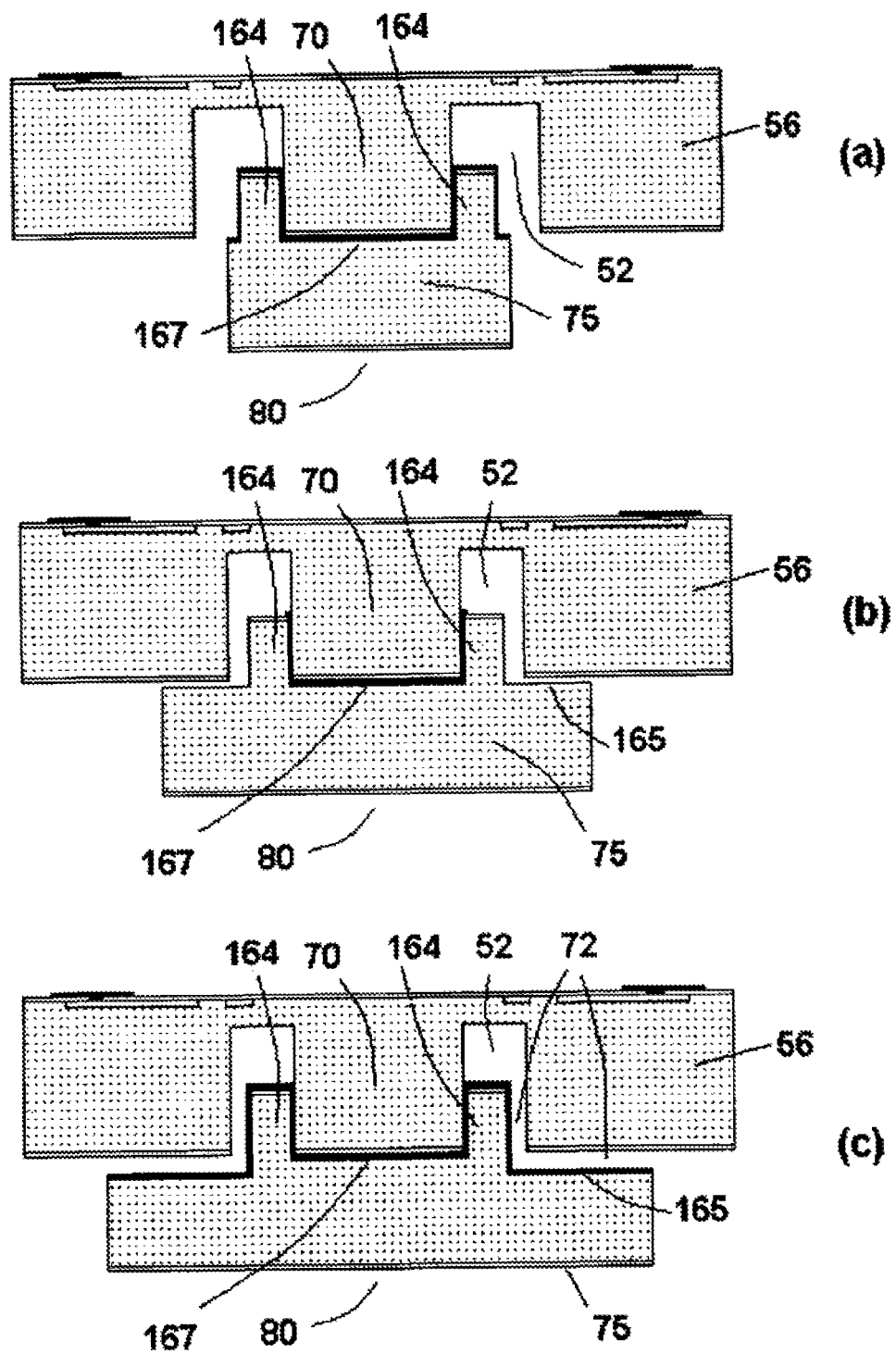
FIG. 22 illustrates completed die with different shapes of force-transferring elements fabricated on a second substrate by a combination of different processes, including deep reactive ion etching and bonding material deposition.

FIG. 22 illustrates additional versions of the same process and corresponding micro-structures of the force-sensitive die.

FIG. 22a shows a force-sensitive die with force-transferring element 75, which does not cover the area of deep trench 52 around the rigid island 70.

FIG. 22b shows a force-sensitive die with force-transferring element 75, which covers completely the area of the rigid island 70 and deep trench 52 around it and separated by a gap in the area 165 of the force-transferring element from the frame 56 of the sensor die. This result is obtained, when bonding layer 68 is deposited locally only in the areas 167 and on the sidewalls of the elements 164.

FIG. 22c illustrates another option, when there is no need for local deposition of the bonding layer. If two-stage DRIE is used for profiling the side one of the mechanical wafer, then the bonding layer is deposited on the entire surface of the mechanical wafer. After bonding with sensor wafer in the areas 167, 164 the areas 165 are separated by a gap 72 from the frame of the sensor die.

Eighth Embodiment

Fabrication process for the sensor wafer is similar to the first embodiment.

Figure 23:
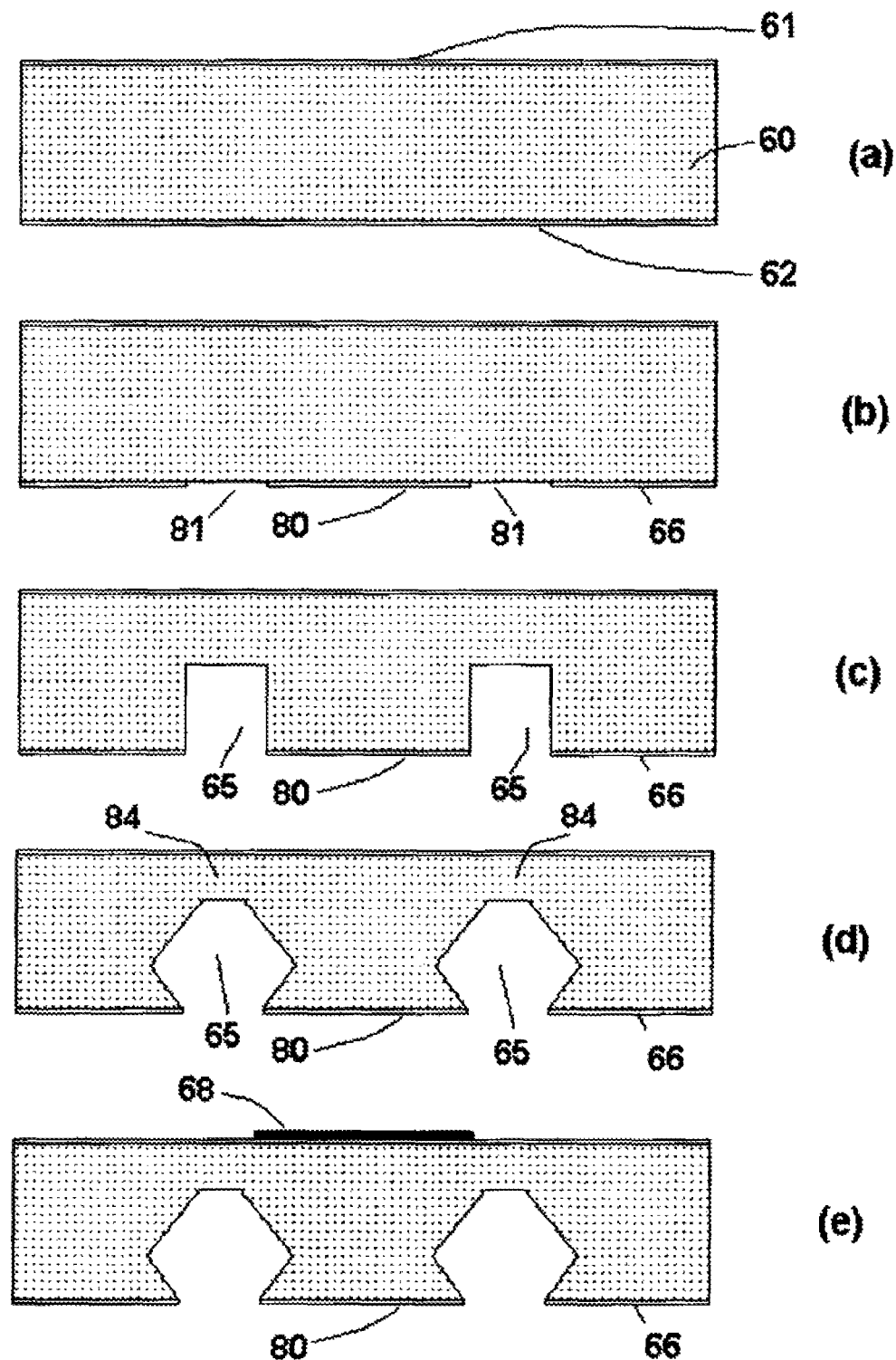
FIG. 23 illustrates a fabrication process of a second (mechanical) substrate combining deep reactive ion etching and wet anisotropic etching.

FIG. 23 shows an example of fabrication process of the mechanical wafer according to the eighth embodiment. FIG. 23a shows initial mechanical wafer 60. The mechanical wafer has side one 61 and side two 62.

FIG. 23b shows pattern 66, 80 formed on the side two of the mechanical wafer at the next step. The pattern 66, 80 defines areas for etching of the mechanical wafer. One or more layers, which serves as a mask during wet anisotropic etching of silicon, are deposited on the mechanical wafer before defining the pattern 66, 80. Examples of such layers have been discussed in the description of the fifth embodiment.

FIG. 23c shows mechanical wafer after the next step—DRIE from the side two. Depth of DRIE is chosen based on the several factors, including target etch depth after wet anisotropic etching, that is used at the next step, mechanical strength of the mechanical wafer after DRIE and wet anisotropic etching, thickness of the protection layer on the side two of the mechanical wafer and its masking properties both in wet anisotropic etching and in DRIE.

Wet anisotropic etching of mechanical wafers is used after DRIE to make profile deeper and obtain negative slopes of the sidewalls. FIG. 23d shows the resulting profile formed after wet anisotropic etching of the mechanical wafer. As it seen, portions of sidewalls of the trenches 65 have negative slope after wet anisotropic etching. Areas 84 will be etched through later in the process using a standard thickness of dielectric layer on the side two of the mechanical wafer 60, as a mask.

FIG. 23e shows the mechanical wafer after next processing step. Bonding material 68 is deposited on the side one of the wafer.

Figure 24:
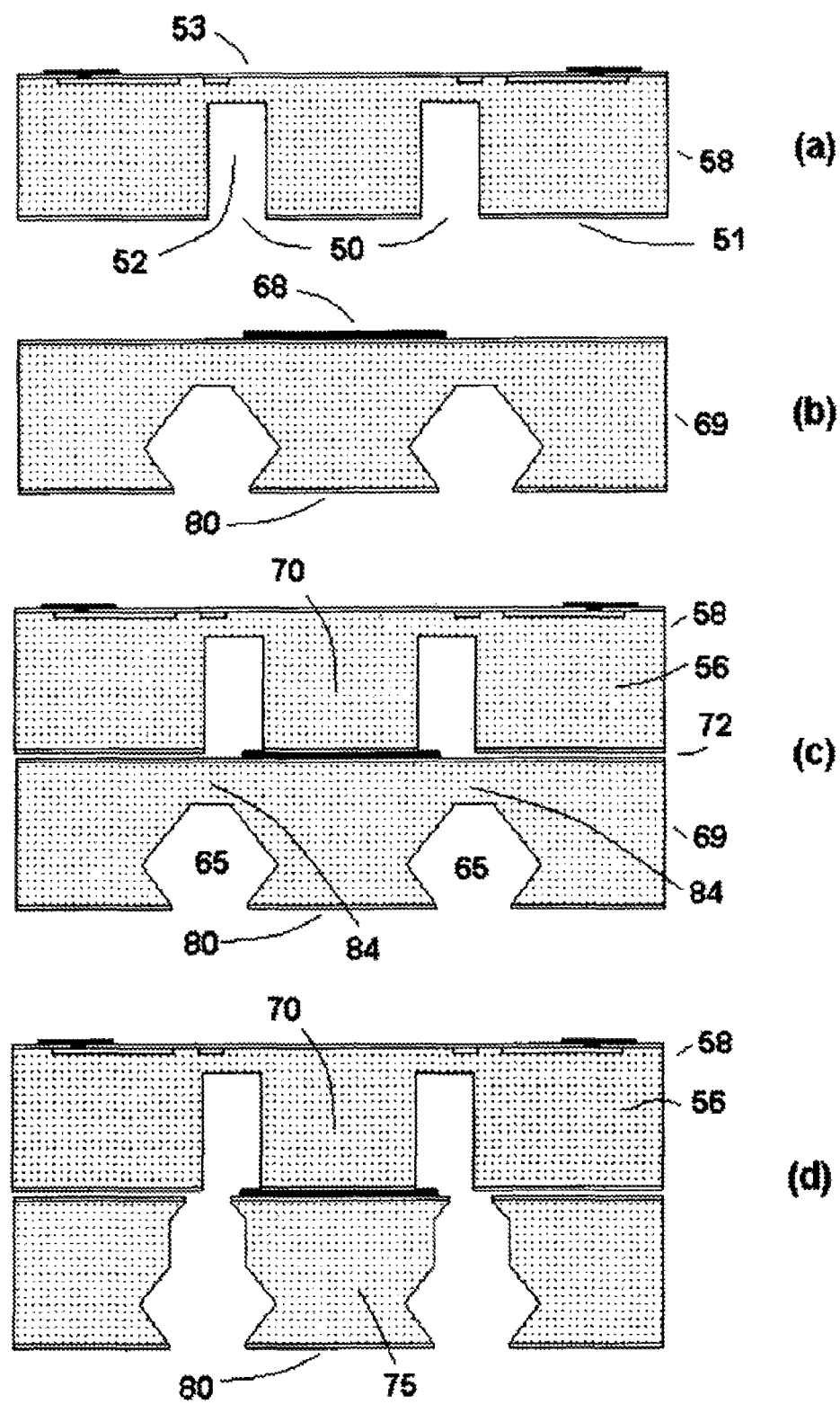
FIG. 24 illustrates a fabrication process back-end using a second (mechanical) substrate with profile formed by combination of deep wet anisotropic etching and wet anisotropic etching prior to bonding to a first substrate.

FIG. 24 shows an example of a fabrication process back-end according to the eighth embodiment. FIG. 24a shows sensor wafer 58 after processing steps described above and illustrated by FIG. 2. FIG. 24b shows mechanical wafer 69 after processing steps described above and illustrated by FIG. 23.

FIG. 24c shows the two wafers aligned and bonded together. As a result of alignment, rigid island 70 of the sensor die 58 is bonded to the mechanical wafer 69, while frame 56 is not bonded to the mechanical wafer 69.

DRIE etching of the mechanical wafer 69 is done after bonding of the sensor and mechanical wafers. DRIE is done from the side two of the mechanical, wafer 69 through the remaining thickness of the diaphragms 84. As a result of DRIE areas 84 in mechanical wafers are etched through.

FIG. 24d shows force-sensitive die after the DRIE step. As it seen, force-transferring element 75 has sidewalls combining vertical sections, sections with positive slope and sections with negative slope. Force-transferring element 75 formed from the mechanical wafer is attached to the rigid island 70 through the bonding layer. The force-transferring element 75 is not connected to the frame 56 of the sensor die 58.

Ninth Embodiment

Based on the description of the first eight embodiments it can be appreciated that different combinations of micromachining steps can be used in order to define shape of the force-transferring element. This embodiment describes some options for micromachining of the mechanical wafer and corresponding shapes of the force-transferring elements other than ones described in the previous embodiments. Only micromachining steps are described in this embodiment because other steps including double-side alignment and deposition and patterning of the bonding material can be similar to these steps described in the previous embodiments.

Figure 25:
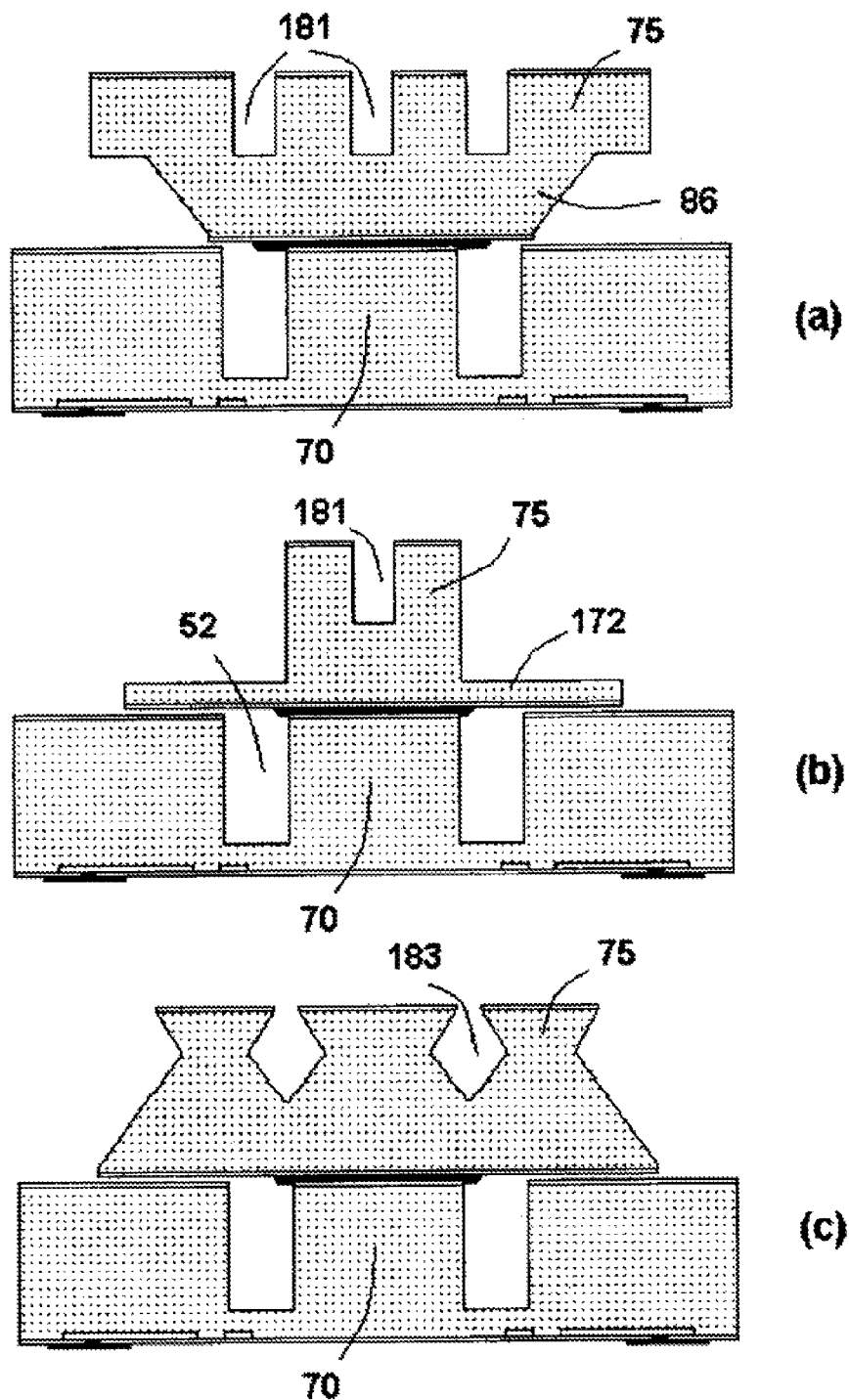
FIG. 25 shows some examples of completed die with different shapes of force-transferring elements fabricated by a combination of wet anisotropic etching and deep reactive ion etching of a second (mechanical) substrate prior to bonding to a first substrate.

FIG. 25 shows some examples of completed die with different shapes of force transferring elements. FIG. 25a shows a force transferring element 75 formed using a process with double-side micromachining similar to that described in the sixth embodiment. Mesa-structure 86 is formed by wet anisotropic etching of the mechanical wafer from the side one. Cavities 181 with vertical walls are formed after bonding sensor and mechanical wafers during final DRIE release etch through the remaining thickness of the mechanical wafer. Cavities 181 can allow stronger connection of the force transferring element 75 with a material, which will be connected to it in the force-sensitive 3D input control device.

FIG. 25b shows force-transferring element with vertical sidewalls and washer-like protective cover 172 of the trench 52 around the rigid island 70. The force-transferring element 75 has also at least one additional vertical-wall cavity 181 on the side two. This additional cavity allows stronger connection with the external material, which will be connected to it in the force-sensitive 3D input control device. Fabrication process of the mechanical wafer can include two or three DRIE steps. The first DRIE step defines cavities in the areas, where the mechanical wafer is later etched through. The mechanical wafer is not etched through at the first DRIE step. Areas corresponding to the washer-like protective cover 172 are opened for etching before the second DRIE step in addition to the areas opened for etching at the first DRIE step. During the second DRIE step mechanical wafer again is not etched through. Finally, the area corresponding to at least one additional cavity 181 is open for DRIE at the third step. Mechanical wafer is etched through at this step. Etching depth in the areas corresponding to the washer-like protective cover 172 is bigger than etching depth in the areas corresponding to the at least one additional cavity 181. Bonding of the mechanical wafer and the sensor wafer is done before the third DRIE etching step. There also other options of the process are possible based on the process variations described in the previous embodiments.

FIG. 25c shows force-transferring element 75. with negative slope sidewalls and negative slope cavities 183 at the top allowing stronger connection with material, which will be connected to it in the force-sensitive 3D input control device. This force-transferring element can be fabricated by using a combination of DRIE and wet anisotropic etching similar to the process described in the eighth embodiment. Micromachining of the mechanical wafer starts with DRIE from the side two. Wet anisotropic etching is used at the next step.

Tenth Embodiment

Figure 26:
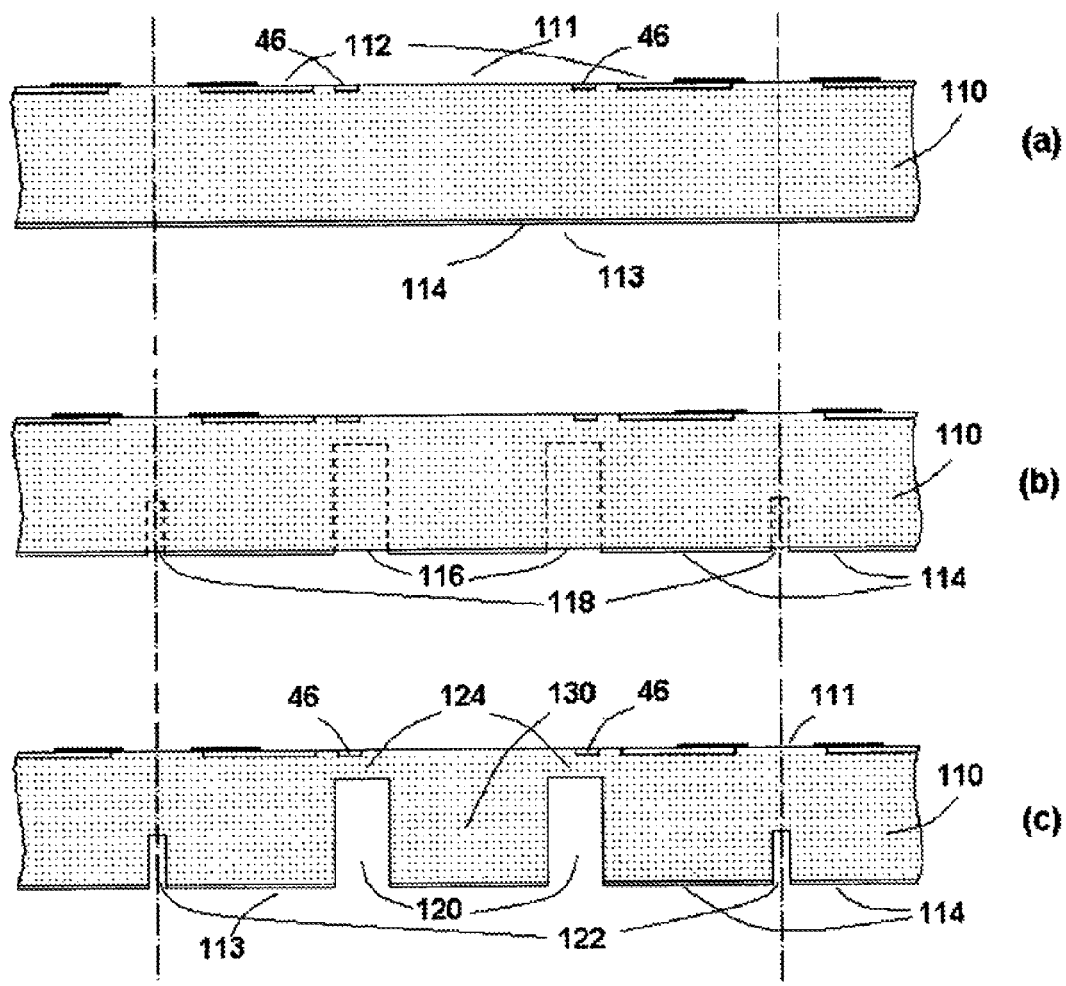
FIG. 26 illustrates a fabrication process of a first (sensor) substrate utilizing simultaneous deep etching of closed trenches and die separation trenches on the side two of the first substrate.

FIG. 26a shows sensor wafer 110 after one or more IC circuits 112 and stress-sensitive circuits are fabricated on the side one. Different types of IC circuits and stress-sensitive circuits that can be fabricated at this step are discussed in the description of the first embodiment.

Micromachining of the sensor wafer is done after fabrication of IC circuits on the side one of the sensor wafer is completed. FIG. 26b shows a pattern 116, 118 for deep etching defined on the side two of the sensor wafer 110. Patterns 116, 118 formed on the side two 113 should be aligned to some pattern on the side one 111 of the sensor wafer to provide alignment of stress-sensitive components 46 with the pattern 116 for micromachining of the elastic elements. Patterns 118 are opened in the area of saw lines of the sensor wafer. These patterns are narrower than the openings 116 for etching of the elastic elements.

FIG. 26c shows completed sensor wafer after DRIE from the side two. Cavities 120, 122 are formed on the side two of the sensor wafer, as a result of this step. DRIE-etched cavities 120 can have annular shape. The cavities define the elastic elements or diaphragms 124 and the rigid island 130 in the center of the diaphragm 124. Stress-sensitive components 46 can be located within or close to either edge of the diaphragm areas 124 and aligned relative to certain crystallographic directions. Cavities 122 or separation trenches are etched in the areas of saw lines for separating dice.

The etch rate in DRIE depends on the width of the open for etching areas. The smaller the width of the open area or line the lower the etching rate is. Therefore, by choosing width of the separation trenches 122 with respect to the width of the open areas 120 for the closed trench etching it is possible to control depth of the separation trenches 122. Depth of the separation trenches 122 is smaller than the depth of the trenches 120, as it is shown in FIG. 26c. Target etching depth of the separation trenches 122 is chosen based on the back-end process requirements and requirements to the mechanical strength of the sensor wafer.

Different process options are available for fabrication of the mechanical wafer, bonding of the sensor wafer to the mechanical wafer and other back-end processing steps. Some of these options are described above in the first nine embodiments.

Figure 27:
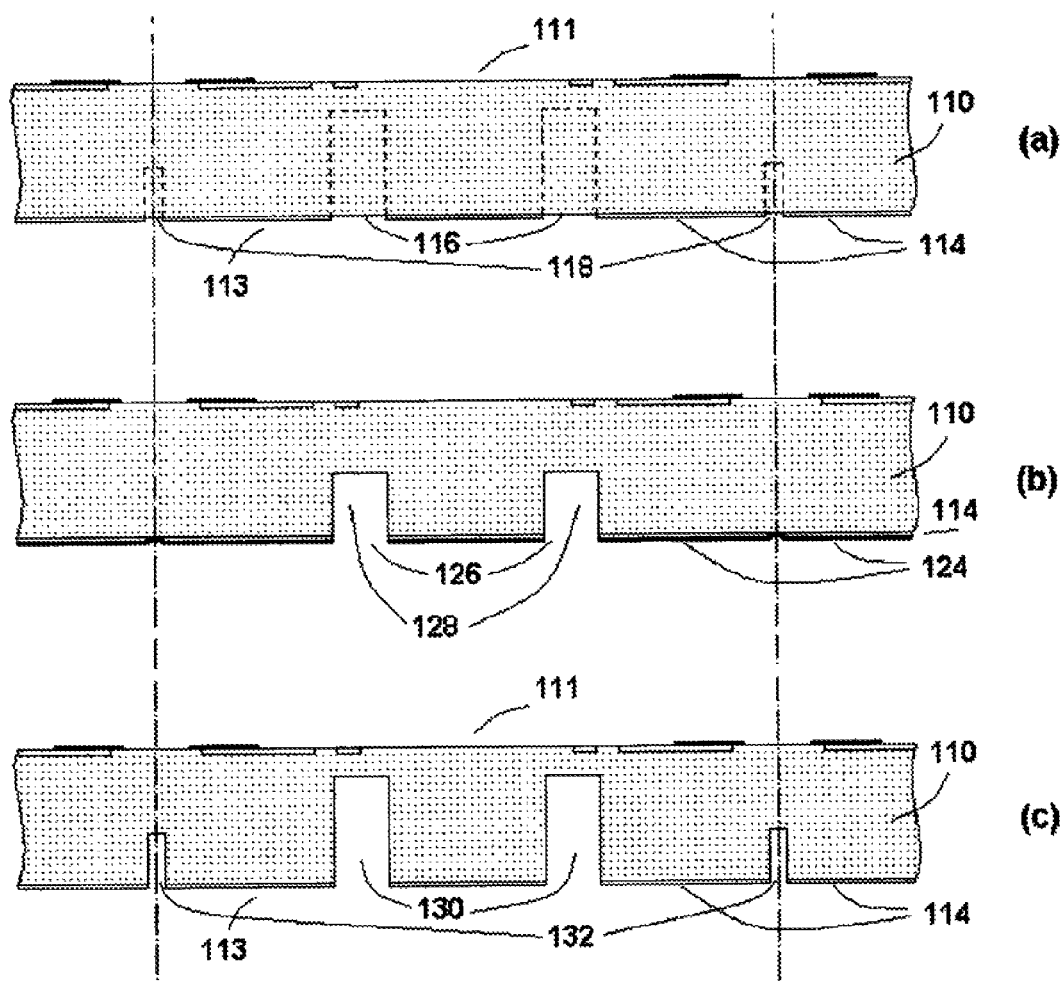
FIG. 27 illustrates a fabrication process of a first substrate utilizing two masking layers and two steps of DRIE for micromachining closed trenches and die separation trenches on the side two of the first substrate.

FIG. 27 shows another example of sensor wafer fabrication process according to the tenth embodiment.

FIG. 27a shows sensor wafer with a CMOS-like process completed on the side one 111. First masking layer 114 is deposited on the side two 113 of the sensor wafer 110 after completion of the CMOS-like process. Alternatively, layers 114 formed on the side two 113 of the sensor wafer as a result of CMOS-like process are used as a first masking layer. Lithography on the side two 113 of the sensor wafer and etching of the first masking layer 114 is done at the next step. As a result of this step a patterns 116, 118 are formed in the first masking layer. The pattern 116 defines a closed trench and pattern 118 defines a set of separation grooves between the dice. Patterns formed on the side two 113 are aligned to some patterns on the side one 111 of the sensor wafer 110.

FIG. 27b shows the sensor wafer 110 after deposition and patterning of a second masking layer 124 on the side two of the sensor wafer 110 and first DRIE etching step. Photoresist is used as a second masking layer. Other masking materials, as for example, PECVD oxide, PECVD nitride and other CVD dielectric layers also can be used. A pattern in the second masking layer 124 opens areas corresponding to the closed trenches 128. DRIE of these trenches 128 to a selected depth is done after that. Etching depth of the trenches 128 is determined by the difference between the required depth of the separation trenches, which are formed at the next etching step, and the required etching depth of the closed trenches 128.

FIG. 27c shows sensor wafer 110 after removing the second masking layer and finishing the etching of closed trenches 130 and simultaneously etching the separation trenches 132 on the side two with second DRIE step. The first masking layer 114 serves as a mask during the second DRIE step. In other version of the process wet anisotropic etching is used at the second etching step.

Eleventh Embodiment

Sawing or laser cutting are good alternatives to dry and wet micromachining processes in fabrication of the force-sensitive die according to the present invention.

Figure 28:
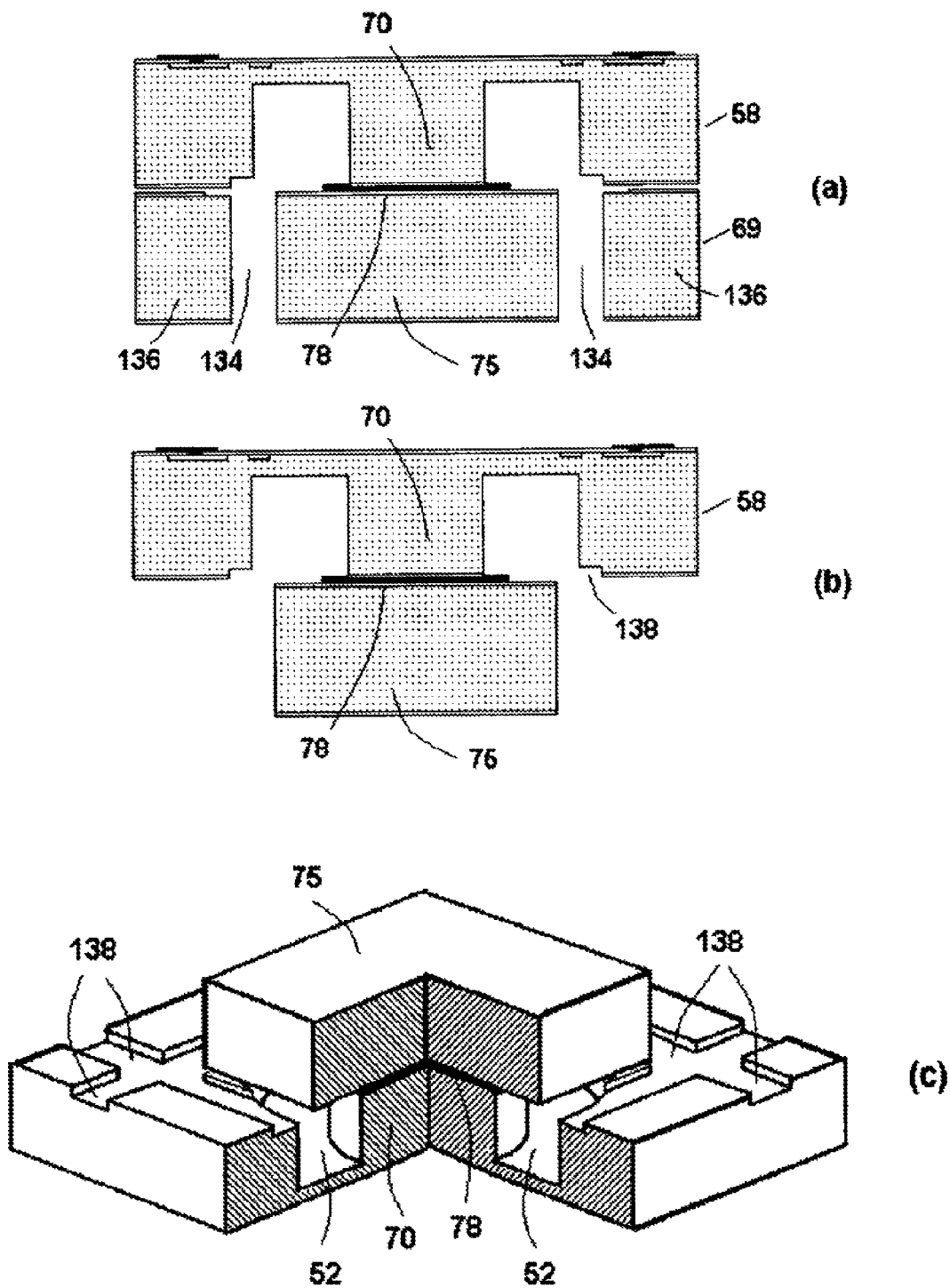
FIG. 28 illustrates a fabrication process back-end, where the force-transferring elements are formed by sawing or cutting.
Figure 29:
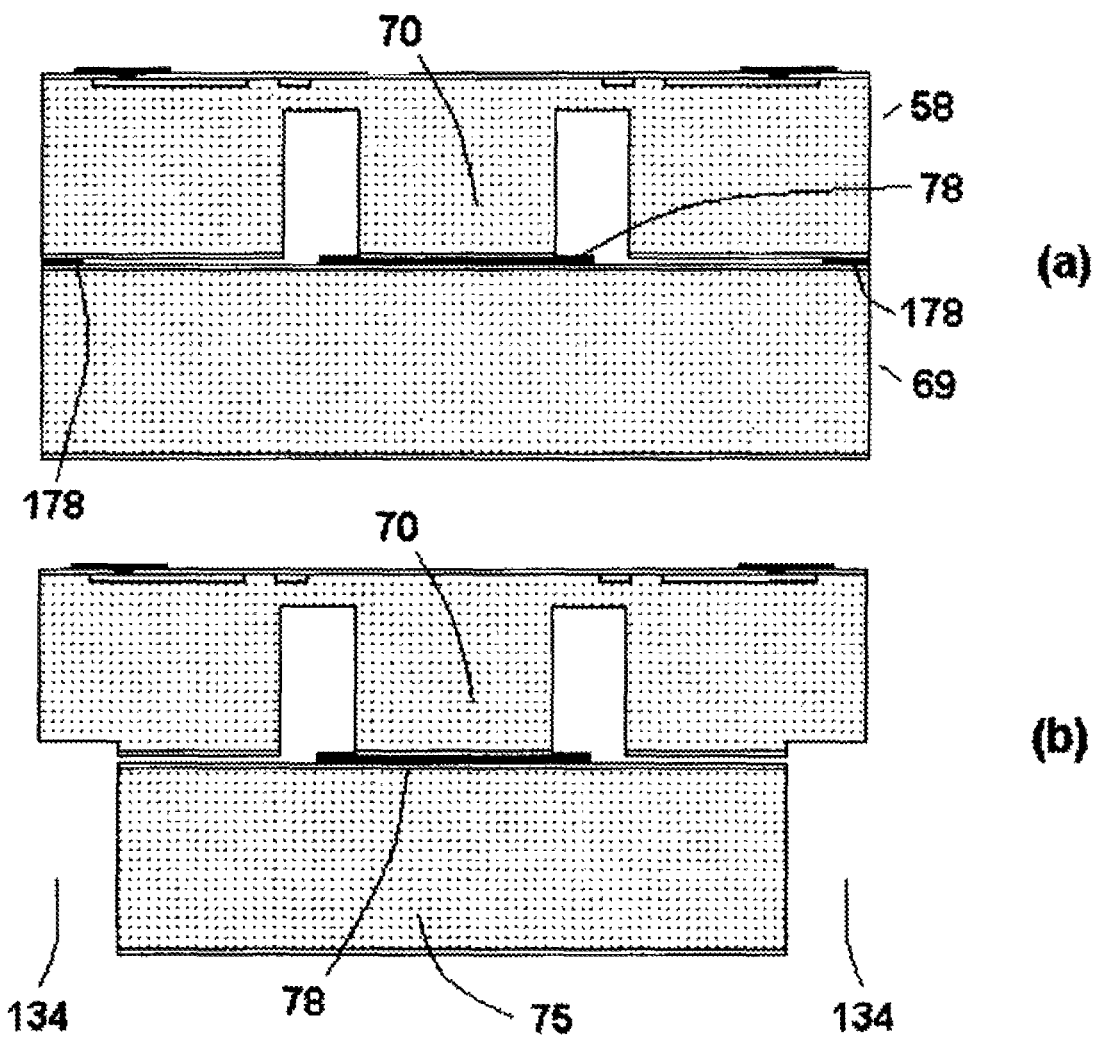
FIG. 29 illustrates another example of a fabrication process back-end with the force-transferring elements formed by sawing or cutting.

FIGS. 28 and 29 show examples of a fabrication process back-end, where the force-transferring elements are formed by sawing or laser cutting instead of etching.

FIG. 28a shows a bonded stack of processed sensor wafer 58 and mechanical wafer 69. Mechanical wafer 69 is bonded to the sensor wafer 58 using patterned bonding material 78. No micromachining of the mechanical wafer is necessary before the bonding step.

The stack of the sensor and mechanical wafers is sawn or laser cut from the side two of the mechanical wafer after bonding. Trenches 134 formed by sawing separated the force-transferring elements 75 from the frame 136. Force transferring elements 75 are bonded to the rigid islands 70 by the bonding material 78. Frame 136 of the mechanical wafer is not bonded to the sensor wafer after sawing. The resulting structure is shown in FIG. 28b.

Final dicing can be done after forming force-sensitive elements using sawing or laser cutting. FIG. 28c shows an isometric view of the finished force-sensitive die fabricated with the process described in this embodiment.

FIG. 29a shows a bonded stack of processed sensor wafer 58 and mechanical wafer 69 similar to one described above in the description of FIG. 28a. Bonding between the sensor wafer 58 and mechanical wafer 69 is done also in some areas 178 other than rigid islands.

The stack of the sensor and mechanical wafers is cut from the side two of the mechanical wafer after bonding. The resulting structure is shown in FIG. 29b. Trenches 134 formed by cutting separated the force-transferring elements 75 of the adjacent dice. Force transferring elements 75 are bonded to the rigid islands 70 by the bonding material 78. Some of the bonded areas 178 can be mechanically destroyed and removed by cutting. The areas 178, where sensor and mechanical wafers were bonded after bonding step, can help to secure the mechanical wafer during cutting. Some versions of the process include laser cutting, combination of sawing and dry etching and combination of sawing and laser cutting.

Final dicing is done after forming force-sensitive elements.

Twelfth Embodiment

Figure 11:
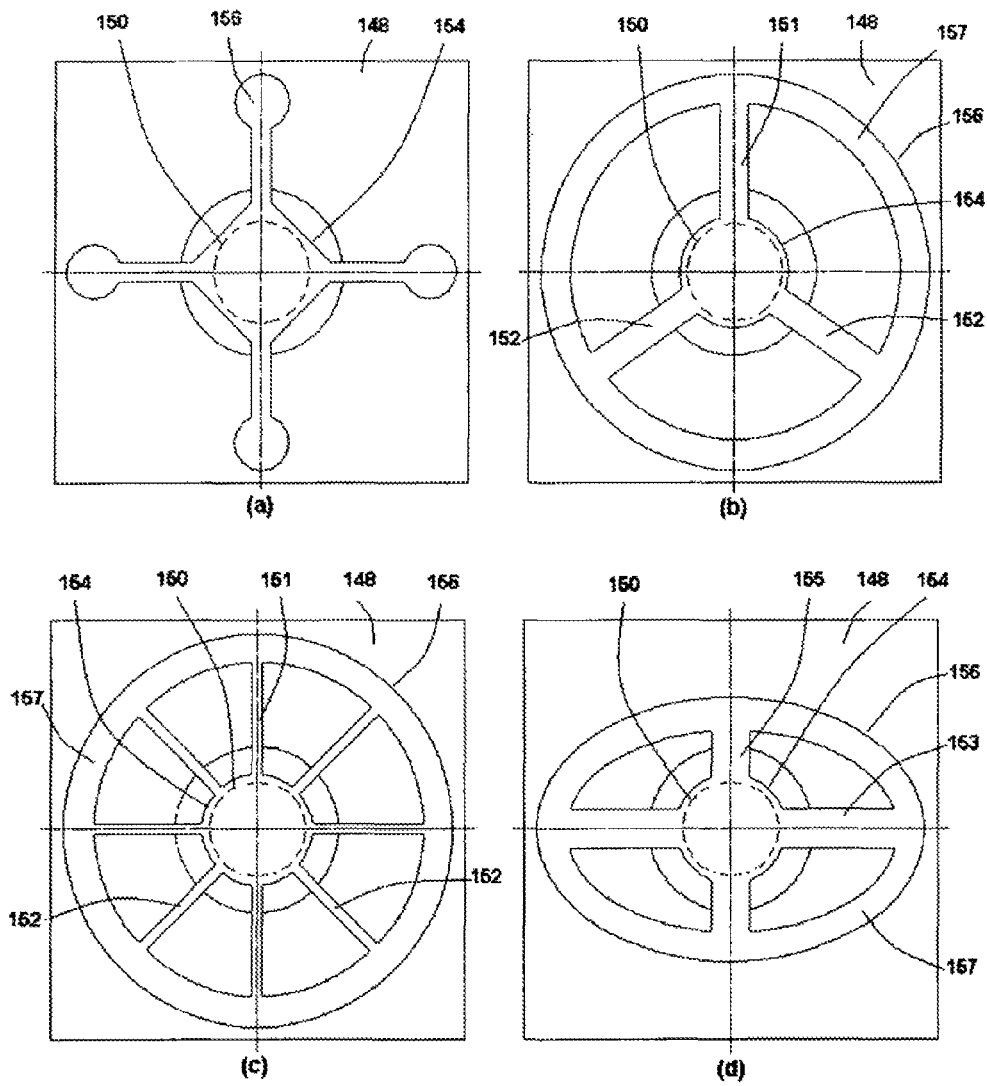
FIG. 11 illustrates a force-sensitive dice with force-transferring elements of different shape.

FIGS. 9-11 show examples of completed die of the force-sensitive input control device according to the present invention.

Assembly of the 3D input control devices requires some additional elements providing interface between external force and the force-sensitive die. For example, if 3D input control device is intended to be used in handheld electronic devices where force is applied by finger then interface can include a button connected to the force-transferring element with or without some intermediate layers. In particular, a plastic button might be connected to the force-transferring element by a layer of polymer. In other version of the device a polymer layer is used as a button and as a connection layer to the force-transferring element.

When polymer is applied directly to the force-sensitive die, then in some cases it can be beneficial to have the polymer material to fill the closed trench between the rigid island and the frame of the sensor die or gap between the force-transferring element and the frame of the sensor die. It results in stronger mechanical connection between the button and the die and increases reliability of the device.

Flow of the polymer material and its ability to penetrate into and fill the closed trenches in the sensor die can be controlled by viscosity of this polymer material, by pressure applied to the polymer material and by hydraulic resistance of the channels connecting the closed trenches to the outside.

FIG. 9 shows completed force-sensitive die, which consists of sensor die 58 with a rigid island 70 and force-transferring element 75 bonded to it by a layer 78 of bonding material. A closed trench 52 surrounds the rigid island 70 and separates it from the frame 56. The force-transferring element 75 is overlapping with the frame 56. However, it is not connected to the frame 56 and separated from it by a narrow gap 72. Viscosity of polymer material applied to the force-transferring element is chosen in such a way that it can not penetrate into the closed trench 52 through the gap 72. However, slots 73 made in the force-transferring element overlap with the closed trench 52 and define four channels opening to the closed trench. Cross-section of the channels and overlap area with the closed trench define hydraulic resistance of the channels. The hydraulic resistance is chosen low enough to allow filling of the closed trench with a polymer material.

For improved mechanical overload protection, the gap between the rigid force-transferring element 75 and the frame 56 is filled in with a compressible material having viscosity low enough to fill the narrow gap 72. Elastic modulus of the compressible material, the size of the overlapping areas and the gap 72 between the rigid force-transferring element 75 and the frame 56 provide the required level of overload protection for the three-dimensional force input control device. The overlapping areas can be located at the interface between the side two of the sensor substrate and the force-transferring element or at the interface between sidewall of the frame 56 and the force-transferring element 75, as it shown in FIG. 22c.

Sensitivity of the 3D force input control device to the lateral (X, Y) and vertical (Z) components of the force vector is one of the most important parameters. For many applications both the ranges of sensitivities and their ratios are predetermined.

Along with the other factors the shape of the force-transferring element affects the ranges of sensitivities and their ratios. Some shapes of the force-transferring elements that can be used in 3D force input control devices are shown in FIG. 10 and FIG. 11. FIG. 10 shows an example of force-sensitive die for use in 3D input control device with cross-shaped force-transferring element. The sensor die 148 has a cylindrical rigid island 150 surrounded by an annular-shaped closed trench 142, which defines an elastic element in the form of diaphragm 145 and separates the rigid island 150 and the frame 146. Force-transferring element 156 has a cross shape. It is connected to the rigid island 150 by a layer of bonding material 158. The cross-shaped force-transferring element has central area 154 and four, arms 153, 155. Two arms 153 are extended along the horizontal axis and the other two arms 155 are extended along the vertical axis. Force applied, to the horizontal or vertical arms is transferred through the rigid island to the diaphragm 145. Stresses in the diaphragm are transformed to electrical signals by stress-sensitive components. Both distribution and maximum level of stress in the diaphragm 145 can be proportional to the length of the arms 153, 155 of the force-transferring element. By changing the relative length of the arms it is possible to adjust X and Y sensitivity and their ratio in the 3D force input control device.

When a vertical force is applied to the 3D force input control device then it is partially transferred to the elastic element 145 through the force-transferring element 156. Force transferred to the elastic element 145 is proportional to the area of the force-transferring element 156, which includes area of the central part 154 and area of four arms 153, 155. Therefore, sensitivity of the 3D force input control device to the vertical force and its ratio to lateral X and Y sensitivities can be made as required by choosing the proper area of the central portion 154 of the force-transferring element 156 and the area of the four arms 153, 155.

Some other shapes of the force-transferring element are shown in FIG. 11. FIG. 11a shows star-shaped force-transferring element 156 with four rays bonded to the rigid island 150 formed in the sensor die 148. In FIG. 11b the force-transferring element 156 has steering wheel shape with three spokes 151, 152 between the rim 157 and central circle 154. The central circle 154 of the force-transferring element 156 is bonded to the rigid island 150. Force-transferring element shown in FIG. 11c has steering wheel shape with multiple spokes 151, 152 between the rim 157 and the central circle 154. FIG. 11d shows elliptical shape force-transferring element 156 with four spokes 153, 155 connecting the rim 157 and the central circle 154. Length of the spokes 153 and 155 is different resulting in different sensitivities in lateral X and Y directions and required ratio of sensitivities in these directions.

For convenience the above description has been focused on representative samples of some possible embodiments, preferred embodiments that teach the invention and convey the best modes and cycles of operations contemplated. The description has not attempted to exhaustively enumerate all possible variations nor embodiments. Alternative embodiments are possible as other devices can be fabricated with proposed methods, and we illustrate 3D force input devices here as an example. It will be appreciated that other embodiments are within the invention scope of the following claims.

What is claimed is:

1. A method of fabrication of 3-dimensional force input control device comprising the steps of:
   providing a first substrate having side one and side two;
   fabricating stress-sensitive IC components and signal processing IC on the side one of the first substrate;
   fabricating one or more closed trenches on the side two of the first substrate within each of a plurality of die areas, said one or more closed trenches creating, within each of the plurality of die areas, elastic element, frame area and a rigid island separated from the frame area;
   providing a second substrate having side one and side two;
   patterning side two of the second substrate to define areas for deep etching;
   creating a layer of bonding material in local areas on at least one of the surfaces of the side one of the second substrate and the side two of the first substrate;
   aligning and bonding the side two of the first substrate with the side one of the second substrate;
   etching the second substrate from the side two through to the first substrate, forming a rigid force-transferring element bonded to the rigid island within each of the plurality of die areas;
   dicing the bonded first and second substrates into multiple separate dice,
   whereby the bonded first and second substrates are processed, aligned, bonded and diced resulting in batch fabricated low cost 3D force input control devices.

2. The method of claim 1, further comprising the step of depositing masking layer on the side two of the first substrate within each of the die area before fabricating the closed trenches on the side two of the first substrate, wherein the masking layer is chosen from the group of materials consisting of: dielectrics, thermally grown silicon dioxide, CVD silicon dioxide, sputtered silicon dioxide, CVD silicon nitride, CVD silicon oxy-nitride, sputtered silicon nitride, silicon carbide, boron carbide, aluminum nitride, aluminum-titanium nitride, metals, aluminum, nickel, molybdenum, polymers, photoresist, polyimide, and combination of the above.

3. The method of claim 1, further comprising the step of creating a masking layer preventing deposition of metal layers during an under-bump metallization (UBM) on side two of the first substrate following the step of fabricating the one or more closed trenches on the side two of the first substrate and within each die area, wherein the masking layer is chosen from the group of materials consisting of: dielectrics, CVD silicon dioxide, CVD silicon nitride, CVD silicon oxy-nitride, silicon carbide, boron carbide, aluminum nitride, aluminum-titanium nitride, polymers, photoresist, polyimide, and combination of the above.

4. The method of claim 1, further comprising the step of performing an under-bump metallization (UBM) fabrication on the side one of the first substrate.

5. The method of claim 1, further comprising fabricating at least one microstructure within the rigid island, wherein a shape of the microstructure is chosen from the group of the shapes consisting of: through hole, cavity, trench, groove, circle, grid, honeycomb or combination of the above; and wherein the fabricating the at least one microstructure comprises fabricating the at least one microstructure within the rigid island at the same step as the fabricating the one or more closed trenches on the side two of the first substrate.

6. The method of claim 1, wherein one or more of the stress-sensitive IC components are fabricated within the elastic element within each of the plurality of die areas.

7. The method of claim 1, further comprising fabricating one or more die separation trenches within each of the plurality of die areas, wherein the one or more die separation trenches are fabricated at the same step as the fabricating the one or more closed trenches on the side two of the first substrate.

8. The method of claim 1, further comprising fabricating at least one component with high profile on the side one of the first substrate in an area of the rigid island within each of the plurality of die areas, providing planarity of the first substrate configured for bonding the first substrate to the second substrate.

9. The method of claim 1, further comprising the step of thinning, within each of the plurality of die areas, the frame area from the side two of the first substrate.

10. The method of claim 1, further comprising the step of depositing a masking layer on the side two of the second substrate prior to the patterning the area for deep etching on the side two of the second substrate, wherein the masking layer is chosen from the group of materials consisting of: dielectrics, thermally grown silicon dioxide, CVD silicon dioxide, sputtered silicon dioxide, CVD silicon nitride, CVD silicon oxy-nitride, sputtered silicon nitride, silicon carbide, boron carbide, aluminum nitride, aluminum-titanium nitride, metals, aluminum, nickel, molybdenum, polymers, photoresist, polyimide, and combination of the above.

11. The method of claim 1, further comprising micromachining, after the step of patterning on the side two of the second substrate to define areas for deep etching, the second substrate with a process chosen from the group of processes consisting of: RIE, wet anisotropic etching, isotropic plasma etching, isotropic wet etching, electrochemical etching, gas etching, electro-discharge machining, laser machining, sawing or combination of the above.

12. The method of claim 1, further comprising the step of etching the side one of the second substrate to shapes serving alternate purposes chosen from the group of purposes consisting of: creating mechanical stops for overload protection, creating required gap between the substrates, creating a frame release groove, creating dicing groove, creating a profile for better bonding and combination.

13. The method of claim 1, further comprising the step of micromachining the side two of the second substrate to shapes serving alternate purposes chosen from the group of purposes consisting of: simplifying the fabrication process and reducing its cost, creating a frame release groove, creating dicing groove, creating a profile for better coupling to an external member, wherein micromachining of the second substrate is done before its bonding to the first substrate.

14. The method of claim 1, further comprising:
creating alignment marks on the second substrate;
depositing the bonding material locally on the side one of the second substrate; and
wherein the etching the second substrate comprises etching the bonded first and second substrates from the side two of the second substrate through the second substrate to the first substrate.

15. The method of claim 1, wherein the process of depositing a bonding material on at least one of the bonding surfaces is chosen from the group of processes consisting of: spinning, contact printing, screen printing, spraying, evaporation, sputtering, electrophoresis, electroplating, electroless plating, chemical deposition or combination.

16. The method of claim 1, following the steps of fabrication of the stress-sensitive IC components and the signal processing IC on the side one of the first substrate, further comprising the steps of:
depositing a first masking layer on the side two of the first substrate;
patterning the first masking layer and defining, within each die area, one or more die separation trenches and the one or more closed trenches such that the one or more closed trenches create the corresponding rigid island on the side two of the first substrate;
depositing a second masking layer on the side two of the first substrate; and
patterning the second masking layer defining the one or more closed trenches on the side two of the first substrate within each of the plurality of die areas;
wherein the fabricating the one or more closed trenches comprises:
deep etching, within each of the plurality of die areas, the one or more closed trenches on the side two of the first substrate to a selected depth;
removing the second masking layer from the side two of the first substrate; and
resuming deep etching of the one or more closed trenches on the side two of the first substrate to a final selected depth, concurrent with etching of the one or more die separation trenches within each die area;
whereby the die separation trenches simplify the step of dicing the bonded first and second substrates in separating the separate dice from the bonded first and second substrates.

17. The method of claim 16, wherein the second masking layer is a photoresist.

18. The method of claim 1, wherein an external dimension of the force-transferring element is chosen from a group of dimensions consisting of: smaller or equal to a size of the rigid island, greater than the size of the rigid island but smaller than a size of the elastic element, and greater than the size of the elastic element.

19. The method of claim 1, further comprising:
fabricating, within each of the rigid force-transferring elements bonded to the rigid islands, at least one channel within the second substrate, such that the at least one channel is connected to at least the one or more closed trenches surrounding the rigid islands within the first substrate.

20. The method of claim 1, further comprising the step of filling at least part of the one or more closed trenches surrounding the rigid island with a compressible material where the compressible material is configured to improve mechanical overload protection.

* * * * *